(12) United States Patent
Wang et al.

(10) Patent No.: US 12,470,692 B2
(45) Date of Patent: Nov. 11, 2025

(54) METHODS AND APPARATUSES FOR VIDEO CODING USING GEOMETRIC PARTITION

(71) Applicant: BEIJING DAJIA INTERNET INFORMATION TECHNOLOGY CO., LTD., Beijing (CN)

(72) Inventors: Xianglin Wang, San Diego, CA (US); Xiaoyu Xiu, San Diego, CA (US); Yi-Wen Chen, San Diego, CA (US); Tsung-Chuan Ma, San Diego, CA (US); Hong-Jheng Jhu, Beijing (CN); Wei Chen, San Diego, CA (US); Che-Wei Kuo, Beijing (CN); Bing Yu, Beijing (CN)

(73) Assignee: BEIJING DAJIA INTERNET INFORMATION TECHNOLOGY CO., LTD., Beijing (CN)

( * ) Notice: Subject to any disclaimer, the term of this patent is extended or adjusted under 35 U.S.C. 154(b) by 268 days.

(21) Appl. No.: 18/070,381

(22) Filed: Nov. 28, 2022

(65) Prior Publication Data

US 2023/0089782 A1     Mar. 23, 2023

Related U.S. Application Data

(63) Continuation of application No. PCT/US2021/035010, filed on May 28, 2021.

(Continued)

(51) Int. Cl.
*H04N 19/105*     (2014.01)
*H04N 19/137*     (2014.01)
*H04N 19/176*     (2014.01)

(52) U.S. Cl.
CPC ......... *H04N 19/105* (2014.11); *H04N 19/137* (2014.11); *H04N 19/176* (2014.11)

(58) Field of Classification Search
CPC .. H04N 19/105; H04N 19/119; H04N 19/137; H04N 19/17; H04N 19/176; H04N 19/577; H04N 19/70
See application file for complete search history.

(56) References Cited

U.S. PATENT DOCUMENTS

| | | | | |
|---|---|---|---|---|
| 2012/0300846 A1* | 11/2012 | Sugio | ...................... | H04N 19/61 375/E7.243 |
| 2020/0021837 A1* | 1/2020 | Ikai | ........................ | H04N 19/52 |

(Continued)

FOREIGN PATENT DOCUMENTS

| | | |
|---|---|---|
| WO | 2020094075 A1 | 5/2020 |
| WO | 2020098713 A1 | 5/2020 |

(Continued)

OTHER PUBLICATIONS

The extended European search report of application No. 21813727.1 dated on Feb. 5, 2024.(8P).

(Continued)

*Primary Examiner* — Peter D Le
(74) *Attorney, Agent, or Firm* — Arch & Lake LLP

(57) ABSTRACT

Methods and apparatuses are provided for video coding. The method includes: partitioning a picture into a plurality of coding units; partitioning a coding unit of the plurality of coding units into two geometric partitions; and performing a predetermined number of motion vector comparison operations during a process of constructing a merging candidate list for either of the two geometric partitions.

18 Claims, 10 Drawing Sheets

| Merge Index | L0 MV | L1 MV |
|:---:|:---:|:---:|
| 0 | X | X |
| 1 | X | X |
| 2 | X | X |
| 3 | X | X |
| 4 | X | X |

Related U.S. Application Data

(60) Provisional application No. 63/032,460, filed on May 29, 2020.

(56) References Cited

U.S. PATENT DOCUMENTS

| | | | | |
|---|---|---|---|---|
| 2021/0006788 A1* | 1/2021 | Zhang | ................... | H04N 19/105 |
| 2021/0344909 A1* | 11/2021 | Liu | ................... | H04N 19/52 |
| 2022/0086433 A1* | 3/2022 | Zhang | ................... | H04N 19/137 |
| 2022/0086493 A1* | 3/2022 | Francois | ................... | H04N 19/503 |
| 2022/0295048 A1* | 9/2022 | Esenlik | ................... | H04N 19/96 |
| 2024/0064288 A1* | 2/2024 | Zhang | ................... | H04N 19/52 |

FOREIGN PATENT DOCUMENTS

| | | | |
|---|---|---|---|
| WO | 2020103936 A1 | 5/2020 | |
| WO | 2020106189 A1 | 5/2020 | |

OTHER PUBLICATIONS

International Search Report issued in Application No. PCT/US2021/035010, dated Sep. 13, 2021,(3p).

Timofey Solovyev et al., 'CE4-4.6: Simplification for merge list derivation in triangular prediction mode', Joint Video Experts Team (JVET) of ITU-T SG 16 WP 3 and ISO/IEC JTC 1/SC 29/WG 11, JVET-N0454, 14th Meeting: Geneva, CH, Mar. 19-27, 2019, (5p).

* cited by examiner

| Merge Index | L0 MV | L1 MV |
|---|---|---|
| 0 | x | |
| 1 | | x |
| 2 | x | |
| 3 | | x |
| 4 | x | |

| Merge Index | L0 MV | L1 MV |
|---|---|---|
| 0 | | x |
| 1 | x | |
| 2 | | x |
| 3 | x | |
| 4 | | x |

| Merge Index | L0 MV | L1 MV |
|---|---|---|
| 0 | x | |
| 1 | x | |
| 2 | x | |
| 3 | | x |
| 4 | | x |

FIG. 12A

| Merge Index | L0 MV | L1 MV |
|---|---|---|
| 0 | | x |
| 1 | | x |
| 2 | x | |
| 3 | x | |
| 4 | x | |

FIG. 12B

| Merge Index | L0 MV | L1 MV |
|---|---|---|
| 0 | x | |
| 1 | | x |
| 2 | | x |
| 3 | x | |
| 4 | x | |

FIG. 12C

| Merge Index | L0 MV | L1 MV |
|---|---|---|
| 0 | | x |
| 1 | | x |
| 2 | x | |
| 3 | x | |
| 4 | | x |

FIG. 12D

| Merge Index | L0 MV | L1 MV |
|---|---|---|
| 0 | x | x |
| 1 | x | x |
| 2 | x | x |
| 3 | x | x |
| 4 | x | x |

METHODS AND APPARATUSES FOR VIDEO CODING USING GEOMETRIC PARTITION

CROSS-REFERENCE TO RELATED APPLICATION

This application is a continuation application of International Application No. PCT/US2021/035010, filed May 28, 2021, which claims priority to Provisional Application No. 63/032,460, filed May 29, 2020, both of which are hereby incorporated by reference in their entireties for all purposes.

FIELD

The present application generally relates to video coding and compression, and in particular but not limited to, methods and apparatuses for motion compensated prediction using triangular prediction unit (i.e., a special case of geometric partition prediction unit) in video coding.

BACKGROUND

Digital video is supported by a variety of electronic devices, such as digital televisions, laptop or desktop computers, tablet computers, digital cameras, digital recording devices, digital media players, video gaming consoles, smart phones, video teleconferencing devices, video streaming devices, etc. The electronic devices transmit, receive, encode, decode, and/or store digital video data by implementing video compression/decompression. Various video coding techniques may be used to compress video data. Video coding is performed according to one or more video coding standards. For example, video coding standards include versatile video coding (VVC), joint exploration test model (JEM), high-efficiency video coding (H.265/HEVC), advanced video coding (H.264/AVC), moving picture experts group (MPEG) coding, or the like.

Video coding generally utilizes prediction methods (e.g., inter-prediction, intra-prediction) that take advantage of redundancy present in video images or sequences. An important goal of video coding techniques is to compress video data into a form that uses a lower bit rate, while avoiding or minimizing degradations to video quality. With ever-evolving video services becoming available, encoding techniques with better coding efficiency are needed. Block partitioning schemes in each standard are also evolving.

Video compression typically includes performing spatial (intra frame) prediction and/or temporal (inter frame) prediction to reduce or remove redundancy inherent in the video data. For block-based video coding, a video frame is partitioned into one or more slices, each slice having multiple video blocks, which may also be referred to as coding tree units (CTUs). Each CTU may contain one coding unit (CU) or recursively split into smaller CUs until the predefined minimum CU size is reached. Each CU (also named leaf CU) contains one or multiple transform units (TUs) and each CU also contains one or multiple prediction units (PUs). Each CU may be coded in intra, inter or IBC modes. Video blocks in an intra coded (I) slice of a video frame are encoded using spatial prediction with respect to reference samples in neighbor blocks within the same video frame. Video blocks in an inter coded (P or B) slice of a video frame may use spatial prediction with respect to reference samples in neighbor blocks within the same video frame or temporal prediction with respect to reference samples in other previous and/or future reference video frames.

Spatial or temporal prediction based on a reference block that has been previously encoded, e.g., a neighbor block, results in a predictive block for a current video block to be coded. The process of finding the reference block may be accomplished by block matching algorithm. Residual data representing pixel differences between the current block to be coded and the predictive block is referred to as a residual block or prediction errors. An inter-coded block is encoded according to a motion vector that points to a reference block in a reference frame forming the predictive block, and the residual block. The process of determining the motion vector is typically referred to as motion estimation. An intra coded block is encoded according to an intra prediction mode and the residual block. For further compression, the residual block is transformed from the pixel domain to a transform domain, e.g., frequency domain, resulting in residual transform coefficients, which may then be quantized. The quantized transform coefficients, initially arranged in a two-dimensional array, may be scanned to produce a one-dimensional vector of transform coefficients, and then entropy encoded into a video bitstream to achieve even more compression.

The encoded video bitstream is then saved in a computer-readable storage medium (e.g., flash memory) to be accessed by another electronic device with digital video capability or directly transmitted to the electronic device wired or wirelessly. The electronic device then performs video decompression (which is an opposite process to the video compression described above) by, e.g., parsing the encoded video bitstream to obtain syntax elements from the bitstream and reconstructing the digital video data to its original format from the encoded video bitstream based at least in part on the syntax elements obtained from the bitstream, and renders the reconstructed digital video data on a display of the electronic device.

With digital video quality going from high definition, to 4K×2K or even 8K×4K, the amount of vide data to be encoded/decoded grows exponentially. It is a constant challenge in terms of how the video data may be encoded/decoded more efficiently while maintaining the image quality of the decoded video data.

In a Joint Video Experts Team (WET) meeting, JVET defined the first draft of Versatile Video Coding (VVC) and the VVC Test Model 1 (VTM1) encoding method. It was decided to include a quadtree with nested multi-type tree using binary and ternary splits coding block structure as the initial new coding feature of VVC. Since then, the reference software VTM to implement the encoding method and the draft VVC decoding process has been developed during the JVET meetings.

SUMMARY

In general, this disclosure describes examples of techniques relating to motion compensated prediction using geometric shaped prediction unit in video coding.

According to a first aspect of the present disclosure, a method for video coding with geometric partition is provided, including: partitioning a picture into a plurality of coding units; partitioning a coding unit of the plurality of coding units into two geometric partitions; and performing a predetermined number of motion vector comparison operations during a process of constructing a merging candidate list for either of the two geometric partitions.

According to a second aspect of the present disclosure, an apparatus for video coding with geometric partition is provided. The apparatus includes one or more processors; and a non-transitory computer-readable storage medium configured to store instructions executable by the one or more processors; wherein the one or more processors, upon execution of the instructions, are configured to perform the method as described in the first aspect of the present disclosure.

According to a third aspect of the present disclosure, a non-transitory computer-readable storage medium for video coding is provided. The non-transitory computer-readable storage medium stores computer-executable instructions that, when executed by one or more computer processors, cause the one or more computer processors to perform the method as described in the first aspect of the present disclosure.

BRIEF DESCRIPTION OF THE DRAWINGS

A more particular description of the examples of the present disclosure will be rendered by reference to specific examples illustrated in the appended drawings. Given that these drawings depict only some examples and are not therefore considered to be limiting in scope, the examples will be described and explained with additional specificity and details through the use of the accompanying drawings.

FIG. 12A to FIG. 12D are schematic diagrams illustrating examples of uni-prediction MV selection for triangle prediction mode in accordance with some implementations of the present disclosure.

DETAILED DESCRIPTION

Reference will now be made in detail to specific implementations, examples of which are illustrated in the accompanying drawings. In the following detailed description, numerous non-limiting specific details are set forth in order to assist in understanding the subject matter presented herein. But it will be apparent to one of ordinary skill in the art that various alternatives may be used. For example, it will be apparent to one of ordinary skill in the art that the subject matter presented herein may be implemented on many types of electronic devices with digital video capabilities.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

Throughout the disclosure, the terms "first," "second," "third," etc. are all used as nomenclature only for references to relevant elements, e.g., devices, components, compositions, steps, etc., without implying any spatial or chronological orders, unless expressly specified otherwise. For example, a "first device" and a "second device" may refer to two separately formed devices, or two parts, components or operational states of a same device, and may be named arbitrarily.

As used herein, the term "if" or "when" may be understood to mean "upon" or "in response to" depending on the context. These terms, if appear in a claim, may not indicate that the relevant limitations or features are conditional or optional.

The terms "module," "sub-module," "circuit," "sub-circuit," "circuitry," "sub-circuitry," "unit," or "sub-unit" may include memory (shared, dedicated, or group) that stores code or instructions that may be executed by one or more processors. A module may include one or more circuits with or without stored code or instructions. The module or circuit may include one or more components that are directly or indirectly connected. These components may or may not be physically attached to, or located adjacent to, one another.

A unit or module may be implemented purely by software, purely by hardware, or by a combination of hardware and software. In a pure software implementation, for example, the unit or module may include functionally related code blocks or software components, that are directly or indirectly linked together, so as to perform a particular function.

Figure 1:
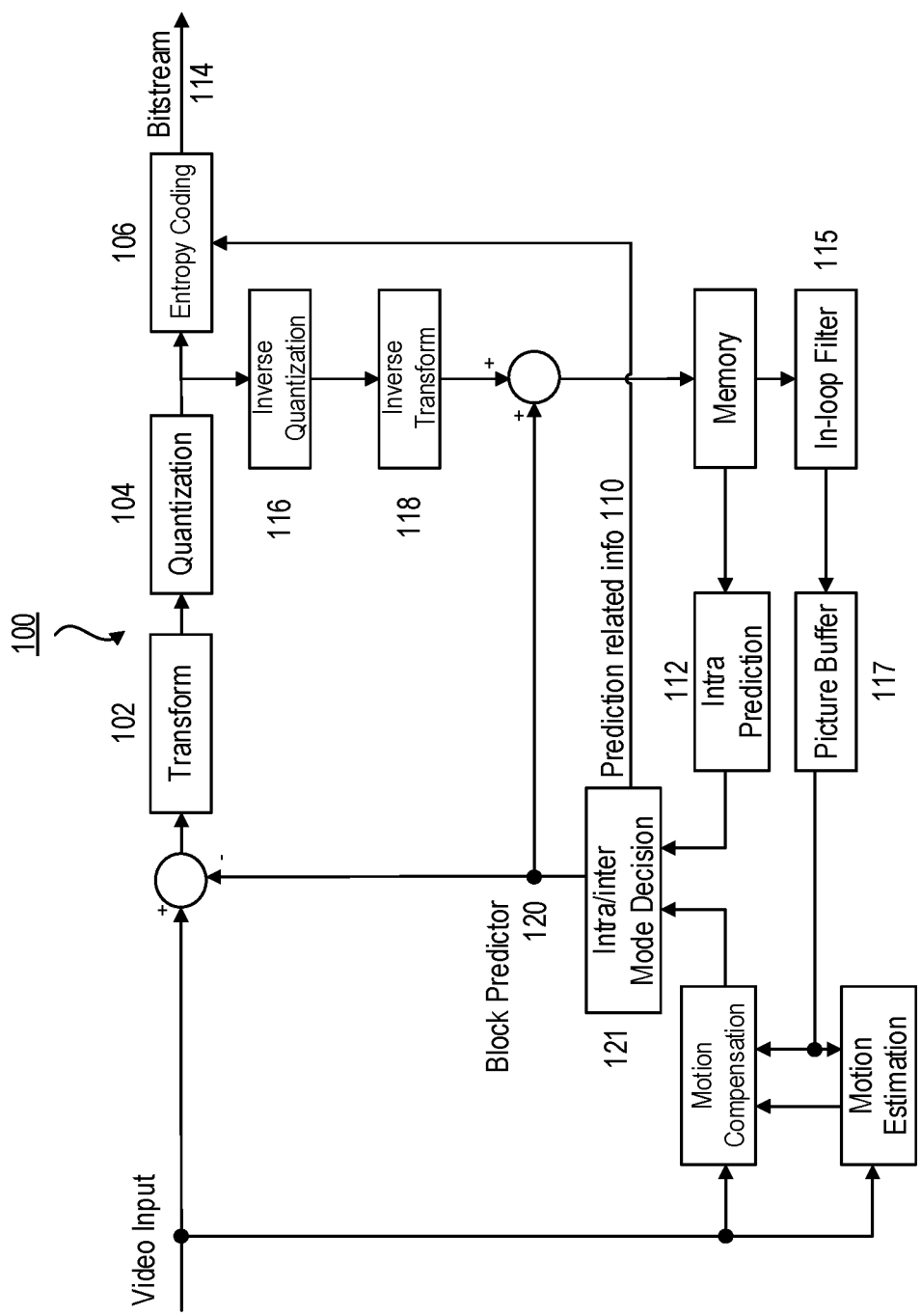
FIG. 1 is a block diagram illustrating an exemplary video encoder in accordance with some implementations of the present disclosure.

FIG. 1 shows a block diagram illustrating an exemplary block-based hybrid video encoder 100 which may be used in conjunction with many video coding standards using block-based processing. In the encoder 100, a video frame is partitioned into a plurality of video blocks for processing. For each given video block, a prediction is formed based on either an inter prediction approach or an intra prediction approach. In inter prediction, one or more predictors are formed through motion estimation and motion compensation, based on pixels from previously reconstructed frames. In intra prediction, predictors are formed based on reconstructed pixels in a current frame. Through mode decision, a best predictor may be chosen to predict a current block.

A prediction residual, representing the difference between a current video block and its predictor, is sent to a Transform circuitry 102. Transform coefficients are then sent from the Transform circuitry 102 to a Quantization circuitry 104 for entropy reduction. Quantized coefficients are then fed to an Entropy Coding circuitry 106 to generate a compressed video bitstream. As shown in FIG. 1, prediction-related information 110 from an inter prediction circuitry and/or an Intra Prediction circuitry 112, such as video block partition info, motion vectors, reference picture index, and intra prediction mode, are also fed through the Entropy Coding circuitry 106 and saved into a compressed video bitstream 114.

In the encoder 100, decoder-related circuitries are also needed in order to reconstruct pixels for the purpose of prediction. First, a prediction residual is reconstructed through an Inverse Quantization 116 and an Inverse Transform circuitry 118. This reconstructed prediction residual is combined with a Block Predictor 120 to generate un-filtered reconstructed pixels for a current video block.

Spatial prediction (or "intra prediction") uses pixels from samples of already coded neighboring blocks (which are called reference samples) in the same video frame as the current video block to predict the current video block.

Temporal prediction (also referred to as "inter prediction") uses reconstructed pixels from already-coded video pictures to predict the current video block. Temporal prediction reduces temporal redundancy inherent in the video signal. Temporal prediction signal for a given coding unit (CU) or coding block is usually signaled by one or more motion vectors (MVs) which indicate the amount and the direction of motion between the current CU and its temporal reference. Further, if multiple reference pictures are supported, one reference picture index is additionally sent, which is used to identify from which reference picture in the reference picture store the temporal prediction signal comes.

After spatial and/or temporal prediction is performed, an intra/inter mode decision circuitry 121 in the encoder 100 chooses the best prediction mode, for example based on the rate-distortion optimization method. The block predictor 120 is then subtracted from the current video block; and the resulting prediction residual is de-correlated using the transform circuitry 102 and the quantization circuitry 104. The resulting quantized residual coefficients are inverse quantized by the inverse quantization circuitry 116 and inverse transformed by the inverse transform circuitry 118 to form the reconstructed residual, which is then added back to the prediction block to form the reconstructed signal of the CU. Further in-loop filtering 115, such as a deblocking filter, a sample adaptive offset (SAO), and/or an adaptive in-loop filter (ALF) may be applied on the reconstructed CU before it is put in the reference picture store of the picture buffer 117 and used to code future video blocks. To form the output video bitstream 114, coding mode (inter or intra), prediction mode information, motion information, and quantized residual coefficients are all sent to the entropy coding unit 106 to be further compressed and packed to form the bit-stream.

For example, a deblocking filter is available in AVC, HEVC as well as the now-current version of VVC. In HEVC, an additional in-loop filter called SAO (sample adaptive offset) is defined to further improve coding efficiency. In the now-current version of the VVC standard, yet another in-loop filter called ALF (adaptive loop filter) is being actively investigated, and it has a good chance of being included in the final standard.

These in-loop filter operations are optional. Performing these operations helps to improve coding efficiency and visual quality. They may also be turned off as a decision rendered by the encoder 100 to save computational complexity.

It should be noted that intra prediction is usually based on unfiltered reconstructed pixels, while inter prediction is based on filtered reconstructed pixels if these filter options are turned on by the encoder 100.

Figure 2:
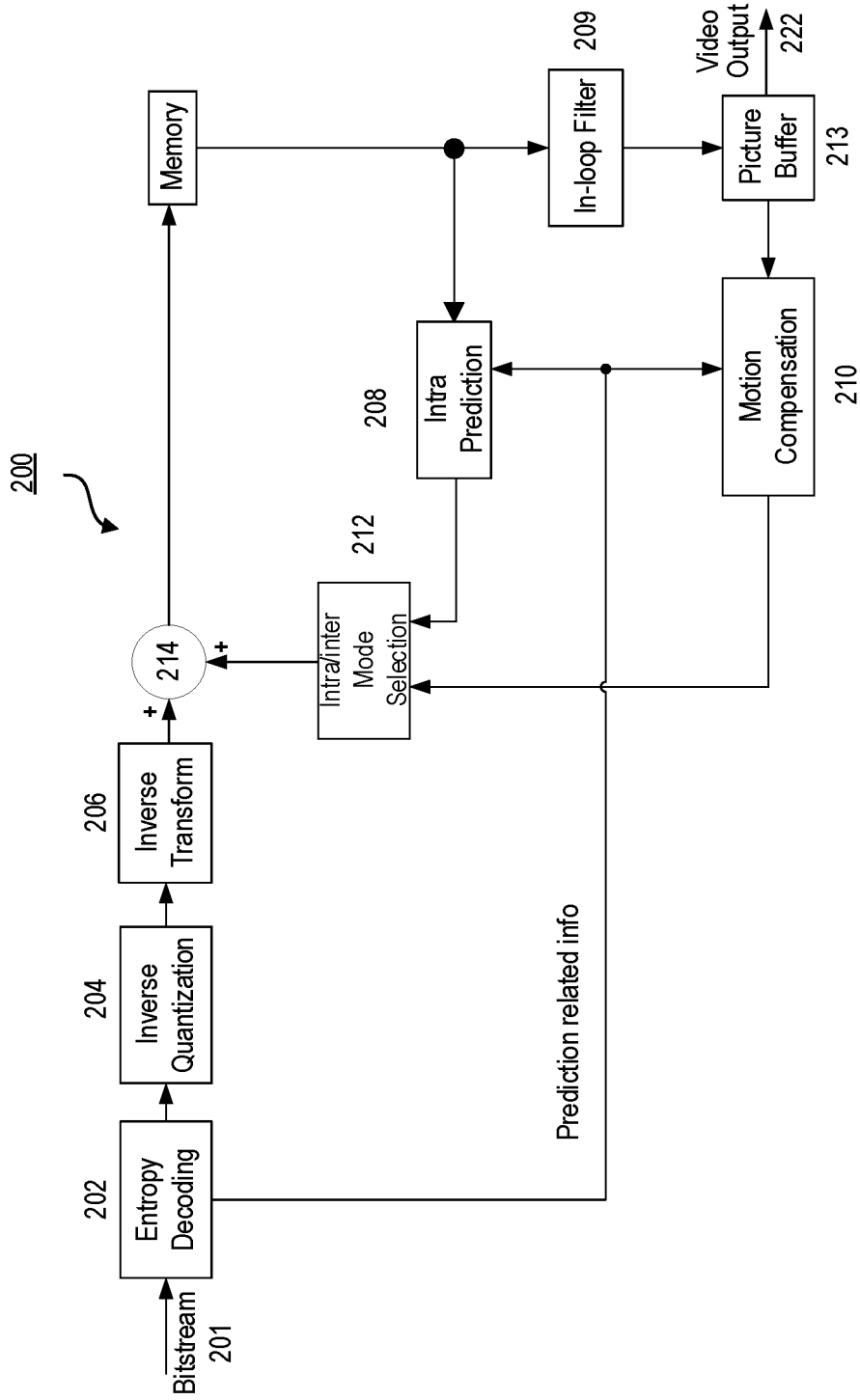
FIG. 2 is a block diagram illustrating an exemplary video decoder in accordance with some implementations of the present disclosure.

FIG. 2 is a block diagram illustrating an exemplary block-based video decoder 200 which may be used in conjunction with many video coding standards. This decoder 200 is similar to the reconstruction-related section residing in the encoder 100 of FIG. 1. In the decoder 200, an incoming video bitstream 201 is first decoded through an Entropy Decoding 202 to derive quantized coefficient levels and prediction-related information. The quantized coefficient levels are then processed through an Inverse Quantization 204 and an Inverse Transform 206 to obtain a reconstructed prediction residual. A block predictor mechanism, implemented in an Intra/inter Mode Selector 212, is configured to perform either an Intra Prediction 208, or a Motion Compensation 210, based on decoded prediction information. A set of unfiltered reconstructed pixels are obtained by summing up the reconstructed prediction residual from the Inverse Transform 206 and a predictive output generated by the block predictor mechanism, using a summer 214.

The reconstructed block may further go through an In-Loop Filter 209 before it is stored in a Picture Buffer 213 which functions as a reference picture store. The reconstructed video in the Picture Buffer 213 may be sent to drive a display device, as well as used to predict future video blocks. In situations where the In-Loop Filter 209 is turned on, a filtering operation is performed on these reconstructed pixels to derive a final reconstructed Video Output 222.

Video coding/decoding standards mentioned above, such as VVC, JEM, HEVC, MPEG-4, Part 10, are conceptually similar. For example, they all use block-based processing. Block partitioning schemes in some standards are elaborated below.

High Efficiency Video Coding (HEVC)

HEVC is based on a hybrid block-based motion-compensated transform coding architecture. The basic unit for compression is termed coding tree unit (CTU). The maximum CTU size is defined as up to 64 by 64 luma pixels, and two blocks of 32 by 32 chroma pixels for 4:2:0 chroma format. Each CTU may contain one coding unit (CU) or recursively split into four smaller CUs until the predefined minimum CU size is reached. Each CU (also named leaf CU) contains one or multiple prediction units (PUs) and a tree of transform units (TUs).

In general, except for monochrome content, a CTU may include one luma coding tree block (CTB) and two corresponding chroma CTBs; a CU may include one luma coding block (CB) and two corresponding chroma CBs; a PU may include one luma prediction block (PB) and two corresponding chroma PBs; and a TU may include one luma transform block (TB) and two corresponding chroma TBs. However, exceptions may occur because the minimum TB size is 4×4 for both luma and chroma (i.e., no 2×2 chroma TB is supported for 4:2:0 color format) and each intra chroma CB always has only one intra chroma PB regardless of the number of intra luma PBs in the corresponding intra luma CB.

For an intra CU, the luma CB may be predicted by one or four luma PBs, and each of the two chroma CBs is always predicted by one chroma PB, where each luma PB has one intra luma prediction mode and the two chroma PBs share one intra chroma prediction mode. Moreover, for the intra CU, the TB size cannot be larger than the PB size. In each PB, the intra prediction is applied to predict samples of each TB inside the PB from neighboring reconstructed samples of the TB. For each PB, in addition to 33 directional intra prediction modes, DC and planar modes are also supported to predict flat regions and gradually varying regions, respectively.

For each inter PU, one of three prediction modes including inter, skip, and merge, may be selected. Generally speaking, a motion vector competition (MVC) scheme is introduced to select a motion candidate from a given candidate set that includes spatial and temporal motion candidates. Multiple references to the motion estimation allow finding the best reference in 2 possible reconstructed reference picture lists (namely List 0 and List 1). For the inter mode (termed AMVP mode, where AMVP stands for advanced motion vector prediction), inter prediction indicators (List 0, List 1, or bi-directional prediction), reference indices, motion candidate indices, motion vector differences (MVDs) and prediction residual are transmitted. As for the skip mode and the merge mode, only merge indices are transmitted, and the current PU inherits the inter prediction indicator, reference indices, and motion vectors from a neighboring PU referred by the coded merge index. In the case of a skip coded CU, the residual signal is also omitted.

Joint Exploration Test Model (JEM)

The Joint Exploration Test Model (JEM) is built up on top of the HEVC test model. The basic encoding and decoding flowchart of HEVC is kept unchanged in the JEM; however, the design elements of most important modules, including the modules of block structure, intra and inter prediction, residue transform, loop filter and entropy coding, are somewhat modified and additional coding tools are added. The following new coding features are included in the JEM.

In HEVC, a CTU is split into CUs by using a quadtree structure denoted as coding tree to adapt to various local characteristics. The decision whether to code a picture area using inter-picture (temporal) or intra-picture (spatial) prediction is made at the CU level. Each CU may be further split into one, two or four PUs according to the PU splitting type. Inside one PU, the same prediction process is applied and the relevant information is transmitted to the decoder on a PU basis. After obtaining the residual block by applying the prediction process based on the PU splitting type, a CU may be partitioned into transform units (TUs) according to another quadtree structure similar to the coding tree for the CU. One of key features of the HEVC structure is that it has the multiple partition conceptions including CU, PU, and TU.

Figure 3:
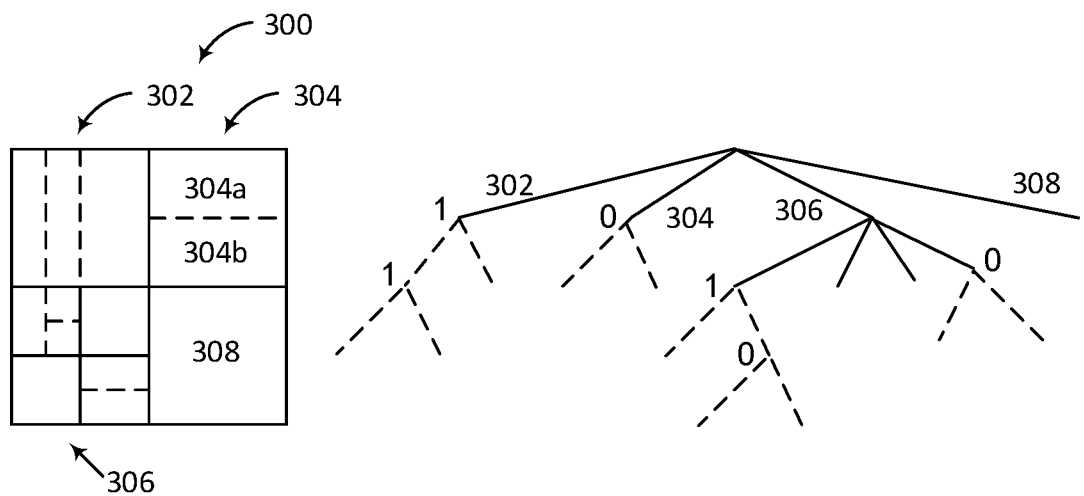
FIG. 3 is a schematic diagram illustrating a quadtree plus binary tree (QTBT) structure in accordance with some implementations of the present disclosure.

FIG. 3 is a schematic diagram illustrating a quadtree plus binary tree (QTBT) structure in accordance with some implementations of the present disclosure.

The QTBT structure removes the concepts of multiple partition types, i.e., it removes the separation of the CU, PU and TU concepts, and supports more flexibility for CU partition shapes. In the QTBT block structure, a CU may have either a square or rectangular shape. As shown in FIG. 3, a coding tree unit (CTU) is first partitioned by a quaternary tree (i.e., quadtree) structure. The quadtree leaf nodes may be further partitioned by a binary tree structure. There are two splitting types in the binary tree splitting: symmetric horizontal splitting and symmetric vertical splitting. The binary tree leaf nodes are called coding units (CUs), and that segmentation is used for prediction and transform processing without any further partitioning. This means that the CU, PU and TU have the same block size in the QTBT coding block structure. In the JEM, a CU sometimes consists of coding blocks (CBs) of different color components, e.g., one CU contains one luma CB and two chroma CBs in the case of P and B slices of the 4:2:0 chroma format, and sometimes consists of a CB of a single component, e.g., one CU contains only one luma CB or just two chroma CBs in the case of I slices.

The following parameters are defined for the QTBT partitioning scheme.
CTU size: the root node size of a quadtree, the same concept as in the HEVC;
MinQTSize: the minimum allowed quadtree leaf node size;
MaxBTSize: the maximum allowed binary tree root node size;
MaxBTDepth: the maximum allowed binary tree depth;
MinBTSize: the minimum allowed binary tree leaf node size.

In one example of the QTBT partitioning structure, the CTU size is set as 128×128 luma samples with two corresponding 64×64 blocks of chroma samples (with a 4:2:0 chroma format), the MinQTSize is set as 16×16, the MaxBTSize is set as 64×64, the MinBTSize (for both width and height) is set as 4×4, and the MaxBTDepth is set as 4. The quadtree partitioning is applied to the CTU first to generate quadtree leaf nodes. The quadtree leaf nodes may have a size from 16×16 (i.e., the MinQTSize) to 128×128 (i.e., the CTU size). If the quadtree leaf node is 128×128, it will not be further split by the binary tree since the size exceeds the MaxBTSize (i.e., 64×64). Otherwise, the quadtree leaf node could be further partitioned by the binary tree. Therefore, the quadtree leaf node is also the root node for the binary tree and it has the binary tree depth as 0. When the binary tree depth reaches MaxBTDepth (i.e., 4), no further splitting is considered. When the binary tree node has a width equal to MinBTSize (i.e., 4), no further horizontal splitting is considered. Similarly, when the binary tree node has a height equal to MinBTSize, no further vertical splitting is considered. The leaf nodes of the binary tree are further processed by prediction and transform processing without any further partitioning. In the JEM, the maximum CTU size is 256×256 luma samples.

An example of block partitioning by using the QTBT scheme, and the corresponding tree representation are illustrated in FIG. 3. The solid lines indicate quadtree splitting and dotted lines indicate binary tree splitting. As shown in FIG. 3, the coding tree unit (CTU) 300 is first partitioned by a quadtree structure, and three of the four quadtree leaf nodes 302, 304, 306, 308 are further partitioned by either a quadtree structure or a binary tree structure. For example, the quadtree leaf node 306 is further partitioned by quadtree splitting; the quadtree leaf node 304 is further partitioned into two leaf nodes 304a, 304b by binary tree splitting; and the quadtree leaf node 302 is also further partitioned by binary tree splitting. In each splitting (i.e., non-leaf) node of the binary tree, one flag is signaled to indicate which splitting type (i.e., horizontal or vertical) is used, where 0 indicates horizontal splitting and 1 indicates vertical splitting. For example, for the quadtree leaf node 304, 0 is signaled to indicate horizontal splitting, and for the quadtree leaf node 302, 1 is signaled to indicate vertical splitting. For quadtree splitting, there is no need to indicate the splitting type since quadtree splitting always splits a block both horizontally and vertically to produce 4 sub-blocks with an equal size.

In addition, the QTBT scheme supports the ability for the luma and chroma to have a separate QTBT structure. Currently, for P and B slices, the luma and chroma CTBs in one CTU share the same QTBT structure. However, for I slices, the luma CTB is partitioned into CUs by a QTBT structure, and the chroma CTBs are partitioned into chroma CUs by another QTBT structure. This means that a CU in an I slice consists of a coding block of the luma component or coding blocks of two chroma components, and a CU in a P or B slice consists of coding blocks of all three color components.

Versatile Video Coding (VVC)

In a Joint Video Experts Team (WET) meeting, the JVET defined the first draft of the Versatile Video Coding (VVC) and the VVC Test Model 1 (VTM1) encoding method. It was decided to include a quadtree with nested multi-type tree using binary and ternary splits coding block structure as the initial new coding feature of VVC.

In VVC, the picture partitioning structure divides the input video into blocks called coding tree units (CTUs). A CTU is split using a quadtree with nested multi-type tree structure into coding units (CUs), with a leaf coding unit (CU) defining a region sharing the same prediction mode (e.g., intra or inter). Here, the term "unit" defines a region of an image covering all components; the term "block" is used to define a region covering a particular component (e.g., luma), and may differ in spatial location when considering the chroma sampling format such as 4:2:0.

Partitioning of the Picture into CTUs

Figure 4:
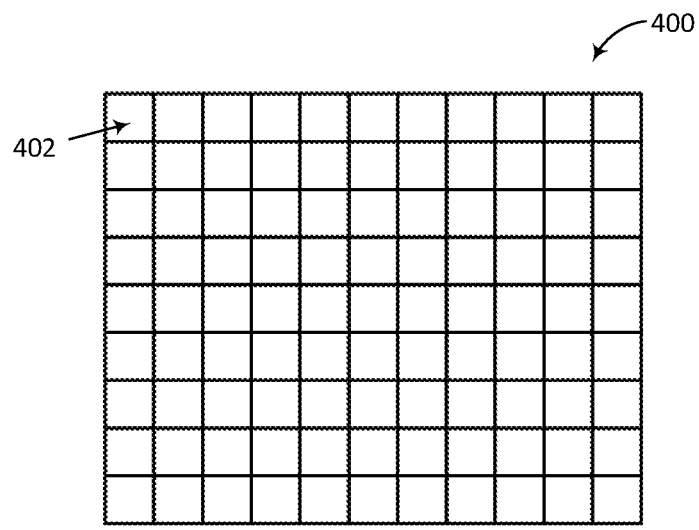
FIG. 4 is a schematic diagram illustrating an example of a picture divided into CTUs in accordance with some implementations of the present disclosure.

FIG. 4 is a schematic diagram illustrating an example of a picture divided into CTUs in accordance with some implementations of the present disclosure.

In VVC, pictures are divided into a sequence of CTUs, and the CTU concept is the same as that of the HEVC. For a picture that has three sample arrays, a CTU consists of an N×N block of luma samples together with two corresponding blocks of chroma samples. FIG. 4 shows the example of a picture 400 divided into CTUs 402.

The maximum allowed size of the luma block in a CTU is specified to be 128×128 (although the maximum size of the luma transform blocks is 64×64).

Partitioning of the CTUs Using a Tree Structure

Figure 5:
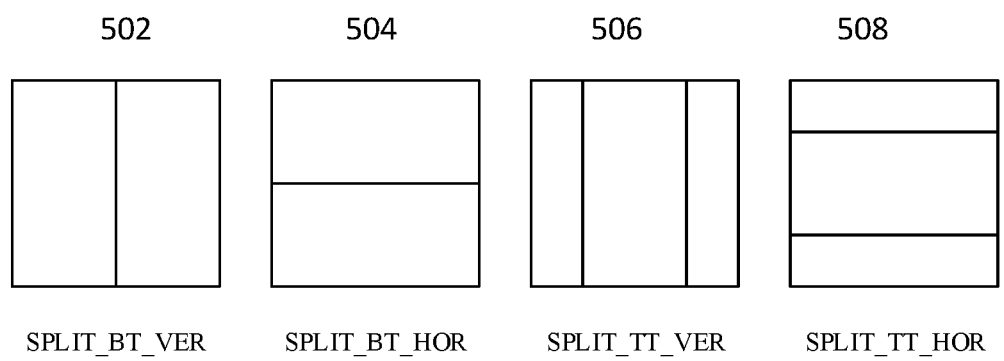
FIG. 5 is a schematic diagram illustrating multi-type tree splitting modes in accordance with some implementations of the present disclosure.

FIG. 5 is a schematic diagram illustrating multi-type tree splitting modes in accordance with some implementations of the present disclosure.

In HEVC, a CTU is split into CUs by using a quaternary-tree structure denoted as coding tree to adapt to various local characteristics. The decision whether to code a picture area using inter-picture (temporal) or intra-picture (spatial) prediction is made at the leaf CU level. Each leaf CU may be further split into one, two or four PUs according to the PU splitting type. Inside one PU, the same prediction process is applied, and the relevant information is transmitted to the decoder on a PU basis. After obtaining the residual block by applying the prediction process based on the PU splitting type, a leaf CU may be partitioned into transform units (TUs) according to another quaternary-tree structure similar to the coding tree for the CU. One of key feature of the HEVC structure is that it has the multiple partition conceptions including CU, PU, and TU.

In VVC, a quadtree with nested multi-type tree using binary and ternary splits segmentation structure replaces the concepts of multiple partition unit types, i.e., it removes the separation of the CU, PU and TU concepts except as needed for CUs that have a size too large for the maximum transform length, and supports more flexibility for CU partition shapes. In the coding tree structure, a CU may have either a square or rectangular shape. A coding tree unit (CTU) is first partitioned by a quaternary tree (i.e., quadtree) structure. Then the quaternary tree leaf nodes may be further partitioned by a multi-type tree structure. As shown in FIG. 5, there are four splitting types in multi-type tree structure: vertical binary splitting 502 (SPLIT_BT_VER), horizontal binary splitting 504 (SPLIT_BT_HOR), vertical ternary splitting 506 (SPLIT_TT_VER), and horizontal ternary splitting 508 (SPLIT_TT_HOR). The multi-type tree leaf nodes are called coding units (CUs), and unless the CU is too large for the maximum transform length, this segmentation is used for prediction and transform processing without any further partitioning. This means that, in most cases, the CU, PU and TU have the same block size in the quadtree with nested multi-type tree coding block structure. The exception occurs when the maximum supported transform length is smaller than the width or height of the color component of the CU. In VTM1, a CU consists of coding blocks (CBs) of different color components, e.g., one CU contains one luma CB and two chroma CBs (unless the video is monochrome, i.e., having only one color component).

Partitioning CUs into Multiple Prediction Units

In VVC, for each CU partitioned based on the structure illustrated above, prediction of the block content may be performed either on the whole CU block or in a sub-block manner explained in the following paragraphs. The operation unit of such prediction is called prediction unit (or PU).

In the case of intra prediction (or intra-frame prediction), usually the size of the PU is equal to the size of the CU. In other words, the prediction is performed on the whole CU block. For inter prediction (or inter-frame prediction), the size of the PU may be equal or less than the size of the CU. In other words, there are cases where a CU may be split into multiple PUs for prediction.

Some examples of having the PU size smaller than the CU size include an affine prediction mode, an Advanced Temporal Level Motion Vector Prediction (ATMVP) mode, and a triangle prediction mode, etc.

Under the affine prediction mode, a CU may be split into multiple 4×4 PUs for prediction. Motion vectors may be derived for each 4×4 PU and motion compensation may be performed accordingly on the 4×4 PU. Under the ATMVP mode, a CU may be split into one or multiple 8×8 PUs for prediction. Motion vectors are derived for each 8×8 PU and motion compensation may be performed accordingly on the 8×8 PU. Under the triangle prediction mode, a CU may be split into two triangular shape prediction units. Motion vectors are derived for each PU and motion compensation is performed accordingly. The triangle prediction mode is supported for inter prediction. More details of the triangle prediction mode are illustrated below.

Triangle Prediction Mode

Figure 6:
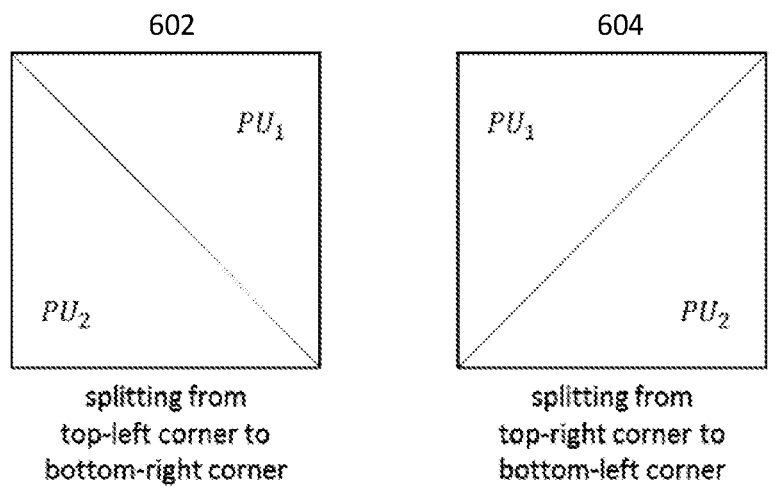
FIG. 6 is a schematic diagram illustrating splitting a CU into triangular prediction units in accordance with some implementations of the present disclosure.

FIG. 6 is a schematic diagram illustrating splitting a CU into triangular prediction units in accordance with some implementations of the present disclosure.

The concept of the triangle prediction mode is to introduce triangular partitions for motion compensated prediction. The triangle prediction mode may also be named the triangular prediction unit mode. As shown in FIG. 6, a CU 602 or 604 is split into two triangular prediction units $PU_1$ and $PU_2$, in either the diagonal or the inverse diagonal direction (i.e., either splitting from top-left corner to bottom-right corner as shown in CU 602, or splitting from top-right corner to bottom-left corner as shown in CU 604). Each triangular prediction unit in the CU is inter-predicted using its own uni-prediction motion vector and reference frame index which are derived from a uni-prediction candidate list. An adaptive weighting process is performed to the diagonal edge after predicting the triangular prediction units. Then, the transform and quantization process are applied to the whole CU. It is noted that this mode is only applied to skip and merge modes in the current VVC. Although in FIG. 6, the CU is shown as a square block, the triangle prediction mode may be applied to non-square (i.e., rectangular) shape CUs as well.

The uni-prediction candidate list may comprise one or more candidates, and each candidate may be a motion vector. Thus, throughout this disclosure, the terms "uni-prediction candidate list," "uni-prediction motion vector candidate list," and "uni-prediction merge list" may be used interchangeably; and the terms "uni-prediction merge candidates" and "uni-prediction motion vectors" may also be used interchangeably.

Uni-Prediction Motion Vector Candidate List

Figure 7:
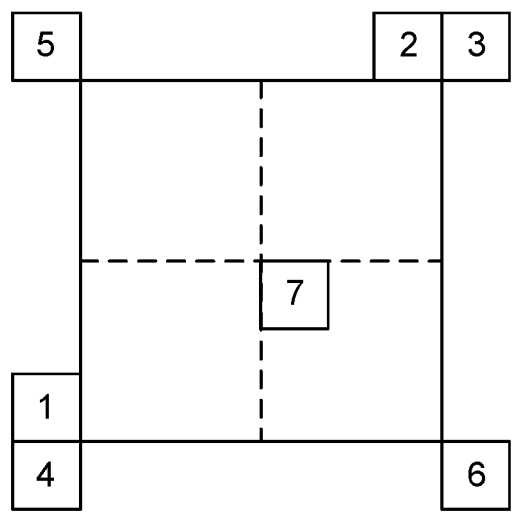
FIG. 7 is a schematic diagram illustrating positions of neighboring blocks in accordance with some implementations of the present disclosure.

FIG. 7 is a schematic diagram illustrating positions of the neighboring blocks in accordance with some implementations of the present disclosure.

In some examples, the uni-prediction motion vector candidate list may include two to five uni-prediction motion vector candidates. In some other examples, other number may also be possible. It is derived from neighboring blocks. The uni-prediction motion vector candidate list is derived from seven neighboring blocks including five spatial neighboring blocks (1 to 5) and two temporal co-located blocks (6 to 7), as shown in FIG. 7. The motion vectors of the seven neighboring blocks are collected into a first merge list. Then, a uni-prediction candidate list is formed based on the first merge list motion vectors according to a specific order. Based on the order, the uni-prediction motion vectors from the first merge list are put in the uni-prediction motion vector candidate list first, followed by reference picture List 0 or L0 motion vector of bi-prediction motion vectors, and then reference picture List 1 or L1 motion vector of bi-prediction motion vectors, and then followed by the averaged motion vector of the L0 and L1 motion vectors of bi-prediction motion vectors. At that point, if the number of candidates is still less than a target number (which may be five), zero motion vectors are added to the list to meet the target number.

Boundary Weighting Process

The uni-prediction motion vector candidate list may consist of five uni-prediction motion vector candidates. It can be derived from seven neighboring blocks including five spatial neighboring blocks (1 to 5) and two temporal co-located blocks.

A predictor is derived for each of the triangular PUs based on its motion vector. It is worth noting that the predictor derived covers a larger area than the actual triangular PU so that there is an overlapped area of the two predictors along the shared diagonal edge of the two triangular PUs. A weighting process is applied to the diagonal edge area between the two predictors to derive a final prediction for the CU. The weighting factors currently used for the luminance and the chrominance samples are $\{7/8, 6/8, 5/8, 4/8, 3/8, 2/8, 1/8\}$ and $\{6/8, 4/8, 2/8\}$, respectively.

Triangle Prediction Mode Syntax and Signaling

Triangle prediction mode is signaled using a triangle prediction flag. The triangle prediction flag is signaled when a CU is coded in either skip mode or merge mode. For a given CU, if the triangle prediction flag has a value of 1, it means that the corresponding CU is coded using triangle prediction mode. Otherwise, the CU is coded using a prediction mode other than triangle prediction mode.

For example, the triangle prediction flag is conditionally signaled in either skip mode or merge mode. Firstly, a triangle prediction tool enable/disable flag is signaled in sequence parameter set (or SPS). Only if this triangle prediction tool enable/disable flag is true, the triangle prediction flag is signaled at CU level. Secondly, triangle prediction tool is only allowed in B-slice. So only in a B-slice, the triangle prediction flag is signaled at CU level. Thirdly, triangle prediction mode is signaled only for a CU with a size equal or larger than a certain threshold. If a CU has a size smaller than that threshold, triangle prediction flag is not signaled. Fourthly, triangle prediction mode may only be signaled for a CU only if that CU is not coded in sub-block merge mode which includes both affine mode and ATMVP mode. In the four cases listed above, when the triangle prediction flag is not signaled, it is inferred as 0 at the decoder side.

When triangle prediction flag is signaled, it is signaled using Context-adaptive binary arithmetic coding (CABAC) entropy coder with certain contexts. The contexts are formed based on the triangle prediction flag values of the top and the left block to the current CU.

To code (i.e., either encoder or decode) a triangle prediction flag for a current block (or a current CU), triangle prediction flags from both the top and the left block (or CU) are derived and their values are summed up. This results in three possible contexts corresponding to the following cases:
1) Both the left block and the top block have a triangle prediction flag of 0;
2) Both the left block and the top block have a triangle prediction flag of 1;
3) Otherwise.

Separate probabilities are maintained for each of the three contexts. Once a context value is determined for a current block, the triangle prediction flag of the current block is coded using the CABAC probability model corresponding to that context value.

If the triangle prediction flag is true, a triangle partition orientation flag is signaled to indicate if the partition is orientated from the top-left corner to the bottom-right corner or from the top-right corner to the bottom-left corner.

In the case where triangle prediction mode is used for a CU, two index values are signaled to indicate the index values of the first and the second uni-prediction merge candidate respectively for triangle prediction. These two index values are used to locate two merge candidates from the uni-prediction motion vector candidate list described above, for the first and second partition, respectively. For triangle prediction, the two index values are required to be different so that the two predictors of the two triangular partitions may be different from each other. As a result, the first index value is signaled directly. To signal the second index value, if it is smaller than the first index value, its value is signaled directly. Otherwise, its value is subtracted by 1 before being signaled to the decoder. At the decoder side, the first index is decoded and used directly. To decode the second index value, a value denoted as "idx" is firstly decoded from CABAC engine. The second index value would be equal to the value of idx if idx is smaller than the first index value. Otherwise, the second index value would be equal to (idx+1).

Geometric Merge Mode

Figures 13, 14:
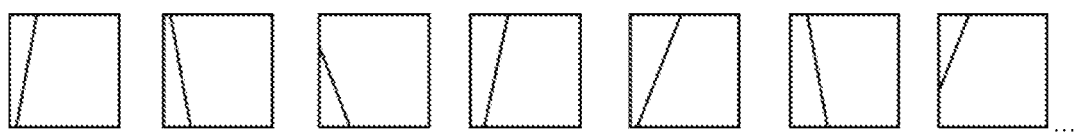
FIG. 13 is a schematic diagram illustrating an example of flexible uni-prediction MV selection for triangle prediction mode in accordance with some implementations of the present disclosure.
FIG. 14 is a schematic diagram illustrating an example of splitting a CU into geometric partitions in accordance with some implementations of the present disclosure.

Under geometric merge mode (i.e., GEO), a CU may be partitioned into two prediction units (i.e., geometric PUs)

according to geometric partition. FIG. 14 illustrates some examples of geometric partition in accordance with some implementations of the present disclosure. As shown in FIG. 14, a CU may be partitioned into two PUs along a line not exactly diagonal, and the two PUs may have geometric shapes such as triangle, wedge, or trapezoid shapes. The geometric merge mode may be considered as an extension of the triangle prediction mode, or a superset of the triangle prediction mode.

Similar to triangle prediction mode, under GEO partitioning only uni-prediction is allowed for each of the two GEO partitions, so that the memory bandwidth requirement under this mode does not exceed that for bi-predicted blocks at the decoder side. Motion vector prediction for GEO partitioning is aligned with the triangle prediction mode. Also similar to triangle prediction mode, a blending operation based on weighted averaging may be applied on the inner boundary between the two partitions in the geometric merge mode. Therefore, techniques relating to motion compensated prediction using triangular prediction unit may also be applied to motion compensated prediction using geometric shaped prediction unit.

Regular Merge Mode Motion Vector Candidate List

According to the current VVC, under the regular merge mode where a whole CU is predicted without splitting into more than one PU, the motion vector candidate list or the merge candidate list is constructed using a different procedure than that for the triangle prediction mode.

Figure 8:
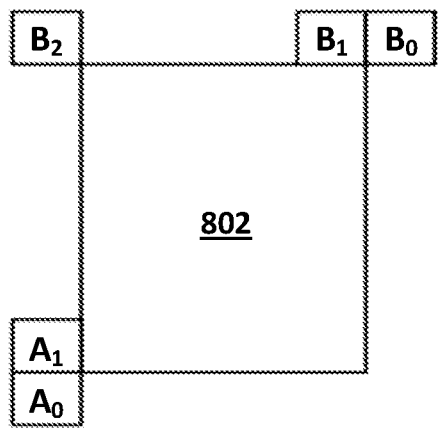
FIG. 8 a schematic diagram illustrating positions of spatial merge candidates in accordance with some implementations of the present disclosure.

Firstly, spatial motion vector candidates are selected based on motion vectors from neighboring blocks as indicated in FIG. 8, which is a schematic diagram illustrating positions of spatial merge candidates in accordance with some implementations of the present disclosure. In the derivation of spatial merge candidates of a current block 802, a maximum of four merge candidates are selected among candidates that are located in positions as depicted in FIG. 8. These candidates are selected according to certain order. One exemplar order of derivation is $A_1 \rightarrow B_1 \rightarrow B_0 \rightarrow A_0 \rightarrow (B_2)$. The position $B_2$ is considered only when any PU of positions $A_1$, $B_1$, $B_0$, $A_0$ is not available or is intra coded. It should be noted that other different orders may also be used.

Figure 9:
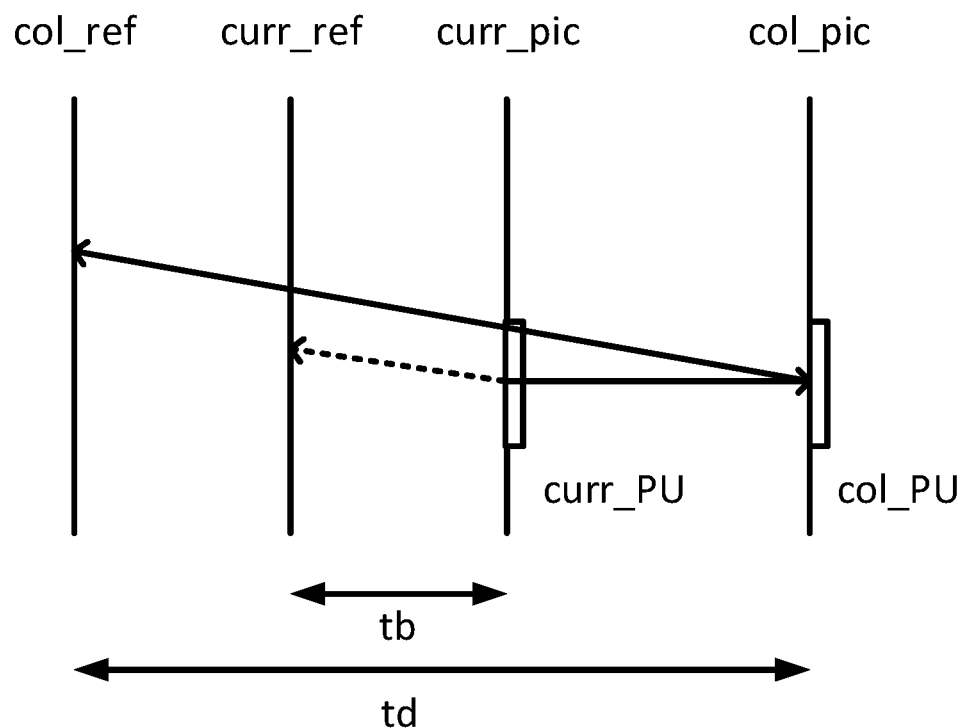
FIG. 9 is a schematic diagram illustrating motion vector scaling for a temporal merge candidate in accordance with some implementations of the present disclosure.

Next, a temporal merge candidate is derived. In the derivation of the temporal merge candidate, a scaled motion vector is derived based on the co-located PU belonging to the picture which has the smallest Picture Order Count (POC) difference with the current picture within the given reference picture list. The reference picture list to be used for derivation of the co-located PU is explicitly signaled in the slice header. The scaled motion vector for the temporal merge candidate is obtained as illustrated by the dotted line in FIG. 9 which illustrates motion vector scaling for the temporal merge candidate in accordance with some implementations of the present disclosure. The scaled motion vector for the temporal merge candidate is scaled from the motion vector of the co-located PU col PU using the POC distances, tb and td, where tb is defined to be the POC difference between the reference picture of the current picture curr_ref and the current picture curr_pic and td is defined to be the POC difference between the reference picture of the co-located picture col_ref and the co-located picture col_pic. The reference picture index of the temporal merge candidate is set equal to zero. A practical realization of the scaling process is described in the HEVC draft specification. For a B-slice, two motion vectors, one for reference picture List 0 and the other for reference picture List 1, are obtained and combined to make the bi-predictive merge candidate.

Figures 10, 11A, 11B:
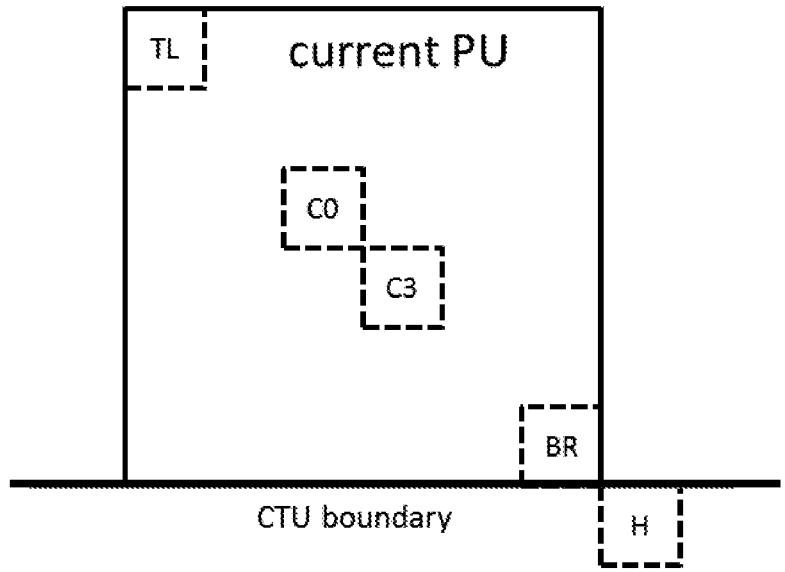
FIG. 10 is a schematic diagram illustrating candidate positions for a temporal merge candidate in accordance with some implementations of the present disclosure.
FIG. 11A and FIG. 11B are schematic diagrams illustrating examples of uni-prediction motion vector (MV) selection for triangle prediction mode in accordance with some implementations of the present disclosure.

FIG. 10 is a schematic diagram illustrating candidate positions for the temporal merge candidate in accordance with some implementations of the present disclosure.

The position of co-located PU is selected between two candidate positions, C3 and H, as depicted in FIG. 10. If the PU at position H is not available, or is intra coded, or is outside of the current CTU, position C3 is used for the derivation of the temporal merge candidate. Otherwise, position H is used for the derivation of the temporal merge candidate.

After inserting both spatial and temporal motion vectors into the merge candidate list as described above, history-based merge candidates are added. The so-called history-based merge candidates include those motion vectors from previously coded CUs, which are maintained in a separate motion vector list, and managed based on certain rules.

After inserting history-based candidates, if the merge candidate list is not full, pairwise average motion vector candidates are further added into the list. As its name indicates, this type of candidates is constructed by averaging candidates already in the current list. More specifically, based on a certain order or rule, two candidates in the merge candidate list are taken each time and the average motion vector of the two candidates is appended to the current list.

After inserting pairwise average motion vectors, if the merge candidate list is still not full, zero motion vectors will be added to make the list full.

Using Regular Merge List Construction Process to Construct a First Merge List for Triangle Prediction The triangle prediction mode in the current VVC shares some similarities with the regular merge prediction mode, in its overall procedures in forming a predictor. For example, under both prediction modes, a merge list needs to be constructed based on at least the current CU's neighboring spatial motion vectors and the co-located motion vectors. At the same time, the triangle prediction mode also has some aspects that are different from the regular merge prediction mode.

For example, although a merge list needs to be constructed under both the triangle prediction mode and the regular merge prediction mode, the detailed procedures of constructing such a list are different.

These differences incur additional cost to codec implementation as additional logics are needed. The procedures and logics of constructing a merge list may be unified and shared between the triangle prediction mode and the regular merge prediction mode.

In some examples, in forming the uni-directional prediction (also called uni-prediction) merge list for the triangle prediction mode, before adding a new motion vector into the merge list, the new motion vector is fully pruned against those motion vectors already in the list. In other words, the new motion vector is compared with each motion vector that is already in the uni-prediction merge list, and is added into the list only when it is different from every motion vector in that merge list. Otherwise, the new motion vector is not added into the list.

According to some examples of the present disclosure, under the triangle prediction mode, the uni-directional prediction merge list is constructed from the regular merge mode motion vector candidate list, which may be referred to as a regular merge list.

More specifically, to construct a merge candidate list for the triangle prediction mode, a first merge list is firstly constructed based on the merge list construction process for the regular merge prediction. The first merge list including a plurality of candidates, each being a motion vector. Then, the uni-directional prediction merge list for the triangle prediction mode is further constructed using the motion vectors in the first merge list.

It should be noted that the first merge list constructed in this case may choose a different list size than that for the general merge mode or regular merge mode. In one example of the present disclosure, the first merge list has the same size as that for the general merge mode. In another example of the present disclosure, the first merge list constructed has a list size different from that for the general merge mode.
Constructing Uni-Directional Prediction Merge List from the First Merge List According to some examples of the present disclosure, the uni-directional prediction merge list for triangle prediction mode may be constructed from the first merge list based on one of the following methods.

In an example of the present disclosure, to construct the uni-directional prediction merge list, prediction List 0 motion vectors of the candidates in the first merge list are checked and selected into the uni-directional prediction merge list first. If the uni-directional prediction merge list is not full (e.g., the number of candidates in this list is still less than the target number) after this process, prediction List 1 motion vectors of the candidates in the first merge list are checked and selected into the uni-directional prediction merge list. If the uni-directional prediction merge list is still not full, prediction List 0 zero vectors are added into the uni-directional prediction merge list. If the uni-directional prediction merge list still not full, prediction List 1 zero vectors are added into the uni-directional prediction merge list.

In another example of the present disclosure, for each candidate in the first merge list, its prediction List 0 motion vector and prediction List 1 motion vector are added in an interleaving manner into the uni-directional prediction merge list. More specifically, for each candidate in the first merge list, if a candidate is a uni-directional prediction motion vector, it is added directly into the uni-directional prediction merge list. Otherwise, if the candidate is a bi-directional prediction motion vector in the first merge list, its prediction List 0 motion vector is first added into the uni-directional prediction merge list, followed by its prediction List 1 motion vector. Once all motion vector candidates in the first merge list are checked and added, but the uni-directional prediction merge list is not full yet, uni-directional prediction zero motion vectors may be added. For example, for each reference frame index, a prediction List 0 zero motion vector and a prediction List 1 zero motion vector may be separately added into the uni-directional prediction merge list until the list is full.

In yet another example of the present disclosure, the uni-directional prediction motion vectors from the first merge list are selected into the uni-directional prediction merge list first. If the uni-directional prediction merge list is not full after this process, for each bi-directional prediction motion vectors in the first merge list, its prediction List 0 motion vector is first added into the uni-directional prediction merge list, followed by its prediction List 1 motion vector. After this process, if the uni-directional prediction merge list is not full yet, uni-directional prediction zero motion vectors may be added. For example, for each reference frame index, a prediction List 0 zero motion vector and a prediction List 1 zero motion vector may be separately added into the uni-directional prediction merge list until the list is full.

In the descriptions above, when a uni-directional prediction motion vector is added into the uni-directional prediction merge list, a motion vector pruning process may be performed to make sure that the new motion vector to be added is different from those motion vectors already in the uni-directional prediction merge list. Such motion vector pruning process may also be performed in a partial manner for lower complexity, e.g., checking the new motion vector to be added only against some but not all motion vectors already in the uni-directional prediction merge list. In an extreme case, no motion vector pruning (i.e., motion vector comparison operation) is performed in the process.

In another example according to the present disclosure, to control the maximum number of motion vector pruning operations that may be performed, one counter can be used for one triangle mode CU to count the total number of motion vector pruning operations that have been conducted so far while selecting uni-directional motion vectors into the uni-directional prediction merge list. As long as the counter is smaller than one pre-defined threshold (also called pre-determined number), motion vector pruning process is performed to check if a current uni-directional motion vector is different from those uni-directional motion vectors that are already selected. Each time the current uni-directional motion vector is compared against a uni-directional motion vector that is already selected; the counter is incremented by 1. If the current motion vector is the same as one of the existing motion vectors selected in the uni-prediction merge list, the current motion vector is not added to the uni-prediction merge list; otherwise (the current uni-directional motion vector is different from all the existing motion vectors in the uni-prediction merge list), the current uni-directional motion vector is added to the uni-prediction merge list. When the counter reaches the pre-defined threshold (predetermined number), no more motion vector pruning operations are performed and a current uni-directional motion vector can be directly added into the uni-prediction merge list. In practice, the pre-defined threshold (predetermined number) mentioned above may be set to different values for various performance/complexity tradeoff. In general, increasing the threshold value can lead to a uni-prediction merge list containing less redundant (i.e., repetitive) motion vectors and better coding efficiency, which however comes at the expense of increased computational complexity. It is worth mentioning that different motion vector pruning methods may be applied when comparing two uni-directional motion vectors. In one method, it is proposed to compare the POC values and the motion vectors (including both horizontal and vertical motion offsets) for motion vector pruning. In another method, it is proposed to only compare the reference picture index and the motion vectors for motion vector pruning.
Constructing Uni-Directional Prediction Merge List from the First Merge List Based on Picture Prediction Configuration In some examples of the present disclosure, the uni-prediction merge list may be constructed in an adaptive manner based on whether a current picture uses backward prediction. For example, the uni-prediction merge list may be constructed using different methods depending on whether a current picture uses backward prediction. If the Picture Order Count (POC) values of all the reference pictures are not greater than the current picture's POC value, it means that the current picture does not use backward prediction.

In an example of the present disclosure, when a current picture does not use backward prediction, or upon determining that the current picture does not use backward prediction, prediction List 0 motion vectors of the candidates in the first merge list are checked and selected into the uni-directional prediction merge list first, followed by prediction List 1 motion vectors of those candidates; and if the uni-directional prediction merge list is still not full, uni-prediction zero motion vectors may be added. Otherwise, if the current picture uses backward prediction, prediction List 0 and List 1 motion vectors of each candidate in the first merge list may be checked and selected into the uni-directional prediction merge list in an interleaving manner as described above, i.e., the prediction List 0 motion vector of the first candidate in the first merge list is added, followed by the prediction List 1 motion vector of the first candidate, and then the prediction List 0 motion vector of the second candidate is added, followed by the prediction List 1 motion vector of the second candidate, and so on. At the end of the process, if the uni-directional prediction merge list is still not full, uni-prediction zero vectors may be added.

In another example of the present disclosure, if a current picture does not use backward prediction, prediction List 1 motion vectors of the candidates in the first merge list are checked and selected into the uni-directional prediction merge list first, followed by prediction List 0 motion vectors of those candidates; and if the uni-directional prediction merge list is still not full, uni-prediction zero motion vectors may be added. Otherwise, if the current picture uses backward prediction, prediction List 0 and List 1 motion vectors of each candidate in the first merge list may be checked and selected into the uni-directional prediction merge list in an interleaving manner as described above, i.e., the prediction List 0 motion vector of the first candidate in the first merge list is added, followed by the prediction List 1 motion vector of the first candidate, and then the prediction List 0 motion vector of the second candidate is added, followed by the prediction List 1 motion vector of the second candidate, and so on. At the end of the process, if the uni-directional prediction merge list is still not full, uni-prediction zero vectors may be added.

In yet another example of the present disclosure, if a current picture does not use backward prediction, only prediction List 0 motion vectors of the candidates in the first merge list are checked and selected into the uni-directional prediction merge list first, and if the uni-directional prediction merge list is still not full, uni-prediction zero motion vectors may be added. Otherwise, if the current picture uses backward prediction, prediction List 0 and List 1 motion vectors of each candidate in the first merge list may be checked and selected into the uni-directional prediction merge list in an interleaving manner as described above, i.e., the prediction List 0 motion vector of the first candidate in the first merge list is added, followed by the prediction List 1 motion vector of the first candidate, and then the prediction List 0 motion vector of the second candidate is added, followed by the prediction List 1 motion vector of the second candidate, and so on. At the end of the process, if the uni-directional prediction merge list is still not full, uni-prediction zero vectors may be added.

In still another example of the present disclosure, if a current picture does not use backward prediction, only prediction List 1 motion vectors of the candidates in the first merge list are checked and selected into the uni-directional prediction merge list first, and if the uni-directional prediction merge list is still not full, uni-prediction zero motion vectors may be added. Otherwise, if the current picture uses backward prediction, prediction List 0 and List 1 motion vectors of each candidate in the first merge list may be checked and selected into the uni-directional prediction merge list in an interleaving manner as described above, i.e., the prediction List 0 motion vector of the first candidate in the first merge list is added, followed by the prediction List 1 motion vector of the first candidate, and then the prediction List 0 motion vector of the second candidate is added, followed by the prediction List 1 motion vector of the second candidate, and so on. At the end of the process, if the uni-directional prediction merge list is still not full, uni-prediction zero vectors may be added.

In the above examples, a uni-directional prediction merge list for triangle prediction is constructed by selecting motion vectors from the first merge list into the uni-directional prediction merge list. However, in practice, the methods may be implemented in different ways, with or without the uni-directional prediction (or uni-prediction) merge list being physically formed. In some examples, the first merge list may be used directly without physically creating a uni-directional prediction merge list. For example, the List 0 and/or List 1 motion vectors of each candidate in the first merge list may be simply indexed based on a certain order and accessed directly from the first merge list. That is, after constructing the first merge list which includes a plurality of candidates, each being one or more motion vectors, based on a merge list construction process for regular merge prediction, a uni-directional prediction merge list is not constructed, but instead, an index listing including a plurality of reference indices, each reference index being a reference to a motion vector of a candidate in the first merge list, is constructed. It should be noted that an order of indexing may follow any of the selecting orders described in the examples in which a uni-directional prediction merge list is constructed.

In one example of the present disclosure, when a current picture does not use backward prediction, prediction List 0 motion vectors of the candidates in the first merge list are used as the uni-directional prediction merge candidates, indexed according to the same index order as they are in the first merge list. That is, upon determining that the POC of the current picture is greater than each one of the POCs of the reference pictures, the reference indices are arranged according to a same order of List 0 motion vectors of the candidates in the first merge list. Otherwise, if the current picture uses backward prediction, List 0 and List 1 motion vectors of each candidate in the first merge list are used as the uni-directional prediction merge candidates, indexed based on an interleaving manner, i.e., List 0 motion vector of the first candidate in the first merge list followed by List 1 motion vector of the first candidate, and then List 0 motion vector of the second candidate followed by List 1 motion vector of the second candidate, and so on. That is, upon determining that the POC of the current picture is smaller than at least one of the POCs of the reference pictures, the reference indices are arranged according to an interleaving manner of List 0 and List 1 motion vectors of each candidate in the first merge list, where the candidate is a bi-directional prediction motion vector. In the case where a candidate in the first merge list is a uni-directional motion vector, a zero motion vector is indexed as the uni-directional prediction merge candidate following the motion vector of that candidate. This ensures that for the case where the current picture uses backward prediction, each candidate in the first merge list, regardless it is a bi-directional or uni-directional prediction motion vector, provides two uni-directional motion vectors as the uni-directional prediction merge candidates.

In another example of the present disclosure, when a current picture does not use backward prediction, prediction List 0 motion vectors of the candidates in the first merge list are used as the uni-directional prediction merge candidates, indexed according to the same index order as they are in the first merge list. Otherwise, if the current picture uses backward prediction, List 0 and List 1 motion vectors of each candidate in the first merge list are used as the uni-directional prediction merge candidates, indexed based on an interleaving manner as described above, i.e., List 0 motion vector of the first candidate in the first merge list followed by List 1 motion vector of the first candidate, and then List 0 motion vector of the second candidate followed by list 1 motion vector of the second candidate, and so on. In the case where a candidate in the first merge list is a uni-directional motion vector, the motion vector plus certain motion offset is indexed as the uni-directional prediction merge candidate following the motion vector of the candidate.

In the above processes, when checking a new motion vector to be added into the uni-directional prediction merge list, pruning may be performed fully, or partially. When it is performed partially, it means that the new motion vector is compared against some, but not all, of the motion vectors that are already in the uni-prediction merge list. In an extreme case, no motion vector pruning (i.e., motion vector comparison operation) is performed in the process.

In another example of the present disclosure, to control the maximum number of motion vector pruning operations that may be performed, one counter can be used for one triangle mode CU to count the total number of motion vector pruning operations that have been conducted so far while selecting uni-directional motion vectors into the uni-directional prediction merge list. As long as the counter is smaller than one pre-defined threshold (also called predetermined number), motion vector pruning process is performed to check if a current uni-directional motion vector is different from those uni-directional motion vectors that are already selected. Each time the current uni-directional motion vector is compared against a uni-directional motion vector that is already selected, the counter is incremented by 1. If the current motion vector is the same as one of the existing motion vectors selected in the uni-prediction merge list, the current motion vector is not added to the uni-prediction merge list; otherwise (the current uni-directional motion vector is different from all the existing motion vectors in the uni-prediction merge list), the current uni-directional motion vector is added to the uni-prediction merge list. When the counter reaches the pre-defined threshold (predetermined number), no more motion vector pruning operations are performed and a current uni-directional motion vector can be directly added into the uni-prediction merge list. In practice, the pre-defined threshold (predetermined number) mentioned above may be set to different values for various performance/complexity tradeoff. In general, increasing the threshold value can lead to a uni-prediction merge list containing less redundant (i.e., repetitive) motion vectors and better coding efficiency, which however comes at the expense of increased computational complexity. It is worth mentioning that different motion vector pruning methods may be applied when comparing two uni-directional motion vectors. In one method, it is proposed to compare the POC values and the motion vectors (including both horizontal and vertical motion offsets) for motion vector pruning. In another method, it is proposed to only compare the reference picture index and the motion vectors for motion vector pruning.

The motion vector pruning may also be performed adaptively in forming the uni-prediction merge list, based on whether the current picture uses backward prediction or not. For example, for the examples of the present disclosure relating to index listing construction based on picture prediction configuration, when the current picture does not use backward prediction, motion vector pruning operation is performed, either fully or partially. When the current picture uses backward prediction, motion vector pruning operation is not performed.

Selecting Uni-Prediction Merge Candidates for Triangle Prediction Mode

In addition to the abovementioned examples, other ways of uni-prediction merge list construction or uni-prediction merge candidate selection are disclosed.

In one example of the present disclosure, once the first merge list for the regular merge mode is constructed, uni-prediction merge candidates may be selected for triangle prediction according to the following rules:

for a motion vector candidate in the first merge list, one and only one of its List 0 or List 1 motion vector is used for triangle prediction;

for a given motion vector candidate in the first merge list, if its merge index value in the list is an even number, its List 0 motion vector is used for triangle prediction if it is available, and in the case that this motion vector candidate does not have a List 0 motion vector, its List 1 motion vector is used for triangle prediction; and for a given motion vector candidate in the first merge list, if its merge index value in the list is an odd number, its List 1 motion vector is used for triangle prediction if it is available, and in the case that this motion vector candidate does not have a List 1 motion vector, its List 0 motion vector is used for triangle prediction.

FIG. 11A shows an example of uni-prediction motion vector (MV) selection (or uni-prediction merge candidate selection) for triangle prediction mode. In the example, the first N (e.g., N equals to 5) merge MV candidates derived in the first merge list are indexed from 0 to (N−1); and each row has two columns, representing the List 0 and the List 1 motion vector respectively for a candidate in the first merge list. Each candidate in the list may be either uni-predicted or bi-predicted. For a uni-predicted candidate, it has only a List 0 or a List 1 motion vector, but not both. For a bi-predicted candidate, it has both List 0 and List 1 motion vectors. In FIG. 11A, for each merge index, the motion vectors marked with "x" are those motion vectors to be used first for triangle prediction if they are available. If a motion vector marked in "x" is not available, the unmarked motion vector corresponding to the same merge index is then to be used for triangle prediction.

The above concept may be extended to other examples. FIG. 11B shows another example of uni-prediction motion vector (MV) selection for triangle prediction mode. According to FIG. 11B, the rules for selecting uni-prediction merge candidates for triangle prediction are as follows:

for a motion vector candidate in the first merge list, one and only one of its List 0 or List 1 motion vector is used for triangle prediction;

for a given motion vector candidate in the first merge list, if its merge index value in the list is an even number, its List 1 motion vector is used for triangle prediction if it is available, and in the case that this motion vector candidate does not have a List 1 motion vector, its List 0 motion vector is used for triangle prediction; and for a given motion vector candidate in the first merge list, if its merge index value in the list is an odd number, its List 0 motion vector is used for triangle prediction if it is available, and in the case that this motion vector candidate does not have a List 0 motion vector, its List 1 motion vector is used for triangle prediction.

In some examples, other different orders may be defined and used for selecting uni-prediction merge candidates for triangle prediction from those motion vector candidates in the first merge list. More specifically, for a given motion vector candidate in the first merge list, the decision of whether its List 0 or List 1 motion vector is used first when available for triangle prediction does not have to be dependent on the parity of the candidate's index value in the first merge list as described above. For examples, the following rules may also be used:

for a motion vector candidate in the first merge list, one and only one of its List 0 or List 1 motion vector is used for triangle prediction;

based on a certain pre-defined pattern, for a number of motion vector candidates in the first merge list, their List 0 motion vector are used for triangle prediction if available, and in the case that a List 0 motion vector does not exist, the corresponding List 1 motion vector is used for triangle prediction; and based on the same pre-defined pattern, for the remaining motion vector candidates in the first merge list, their List 1 motion vector are used for triangle prediction if available, and in the case that a List 1 motion vector does not exist, the corresponding List 0 motion vector is used for triangle prediction.

FIGS. 12A to 12D show some examples of the pre-defined patterns in uni-prediction motion vector (MV) selection for triangle prediction mode. For each merge index, the motion vectors marked with "x" are those motion vectors used first for triangle prediction if they are available. If a motion vector marked in "x" is not available, the unmarked motion vector corresponding to the same merge index is then used for triangle prediction.

In FIG. 12A, for the first three motion vector candidates in the first merge list, their List 0 motion vectors are checked first. Only when a List 0 motion vector is not available, the corresponding List 1 motion vector is used for triangle prediction. For the fourth and fifth motion vector candidates in the first merge list, their List 1 motion vectors are checked first. Only when a List 1 motion vector is not available, the corresponding List 0 motion vector is used for triangle prediction. FIGS. 12B to 12D show three other patterns in selecting uni-prediction merge candidates from the first merge list. The examples shown in the figures are not limiting, and there exist further examples. For instance, the horizontally and/or vertically mirrored versions of those patterns shown in FIGS. 12A to 12D may also be used. Other different patterns may still exist. However, to those skilled in the art from consideration of the specification and practice of the disclosure disclosed herein, the idea explained above is applicable to all these different patterns and/or examples.

In the above examples, when selecting the uni-directional motion vector of one motion vector candidate in the first merge list, motion vector pruning is not performed. Although such method has low complexity, the uni-directional motion vectors in the generated uni-prediction merge list may be redundant in the sense that some motion vectors in the uni-prediction merge list may have exactly the same motion, which can reduce the overall coding efficiency of the triangle mode. To achieve a better performance/complexity tradeoff, it is proposed in one embodiment of the disclosure to add a number of motion vector pruning operations to the proposed pattern-based uni-prediction merge list generation scheme. To facilitate the illustration, it assumes that there are N=5 merge MV candidates derived in the first merge list indexed from 0 to 4 and there is M=1 motion vector pruning operation to be performed. Additionally, it is assumed that the merge index parity based method is used to generate the uni-prediction merge list. Based on the assumptions, the proposed uni-prediction merge list generation method can be summarized as follows:

For a motion vector candidate in the first merge list, one and only one of its List 0 or List 1 motion vector is used for triangle prediction.

For the first motion vector candidate (i.e., with a merge index value of 0) in the first merge list, add its List0 motion vector to the uni-prediction merge list if it is available. In case the first motion vector candidate does not have a List0 motion vector, its List1 motion vector is added to the uni-prediction merge list.

For the second motion vector candidate (i.e., with a merge index value of 1) in the first merge list, choose its List1 motion vector as the selected motion vector if it is available. In case the second motion vector candidate does not have a List1 motion vector, its List0 motion vector is chosen as the selected motion vector. Then, the selected motion vector is pruned against the first motion vector in the uni-prediction merge list. If the two motion vectors are the same, the selected motion vector is not added to the uni-prediction merge list; otherwise (the two motion vectors are not the same), the selected motion vector is added to the uni-prediction merge list.

For the other motion vector candidates (i.e., with merge indices 2 to 4) in the first merge list, since the number of motion vector pruning operation performed already reaches the threshold value of M, the uni-directional motion vector is selected based on the parity of their merge index values with no motion vector pruning operation performed. For example, following acts may be performed.

If the merge index is an even number, its List0 motion vector is firstly checked to be included into the uni-prediction merge list. In case its List0 motion vector is unavailable, its List1 motion vector is added to the list.

If the merge index is an odd number, its List1 motion vector is firstly checked to be included into the uni-prediction merge list. In case its List1 motion vector is unavailable, its List0 motion vector is added to the list.

If the uni-prediction merge list is not full, at least one uni-prediction zero vector (e.g., List0) may be added to the uni-prediction list.

Due to motion vector pruning, the merge index value of a uni-directional motion vector selected may no longer be the same as the merge index value of its corresponding motion vector candidate in the first merge list. More specifically, in the example described above, if there is no uni-directional motion vector selected from the second motion vector candidate (i.e., with a merge index value of 1) in the first merge list due to motion vector pruning operation, uni-directional motion vectors selected from later motion vector candidates (i.e., with merge indices 2 to 4) in the first merge list may have a smaller merge index. For example, the uni-directional motion vector selected from the motion vector candidate with a merge index value of 2 in the first merge list would have a merge index value of 1; the uni-directional motion vector selected from the motion vector candidate with a merge index value of 3 in the first merge list would have a merge index value of 2; and so on. In other words, the merge index value of a selected uni-directional motion vector is equal to the merge index value of its corresponding motion vector candidate in the first merge list subtracted by the number of motion vector candidates pruned out before deriving the uni-directional motion vector. According to the example above, the merge index values signaled to decoder are those of the selected uni-directional motion vectors after motion vector pruning, instead of those of their corresponding motion vector candidates in the first merge list.

Based on this example, to decode a triangle mode CU at a decoder end, the merge index values of the selected uni-directional motion vectors are first decoded and parsed; then based on motion vector pruning results and the parsed merge index values, the merge index values of the corresponding motion vectors in the first merge list are derived; finally based on the parity of the merge index values of the corresponding motion vectors in the first merge list, a List 0 or a List 1 motion vector of the corresponding motion vectors in the first merge list is selected and used for the triangle mode CU.

Based on the example described above, an alternative example may also be designed and used according to the current disclosure. In the example described above, in selecting a uni-directional motion vector from a motion vector candidate in the first merge list, the selection order of its List0 and List 1 motion vectors is based on the parity of the merge index value of the motion vector candidate in the first merge list. According to the alternative example, the selection order of List0 motion vector vs. List 1 motion vector may be changed so that it is based on the parity of the merge index value of the uni-directional motion vector after motion vector pruning. In this case, if there is no uni-directional motion vector selected from the second motion vector candidate (i.e., with a merge index value of 1) in the first merge list due to motion vector pruning operation, List 1 motion vector is selected first from the motion vector candidate (i.e., with a merge index value of 2) in the first merge list; if the vector does not exist, the List 0 motion vector is selected.

Based on this alternative example, to decode a triangle mode CU at a decoder end, the merge index values of the selected uni-directional motion vectors are first decoded and parsed; then based on motion vector pruning results and the parsed merge index values, the merge index values of the corresponding motion vectors in the first merge list are derived; finally based on the parity of the parsed merge index values of the selected uni-directional motion vectors, a List 0 or a List 1 motion vector of the corresponding motion vectors in the first merge list is selected and used for the triangle mode CU.

Although, the examples above are illustrated using the merge index parity-based selection priority pattern and one pruning operation, to one skilled person in the art of video coding, the proposed example is equally applicable wherein other motion vector selection priority patterns and different number of motion vector pruning operations are used.

Flexible Merge List Construction and Candidate Index Signaling for Triangle Prediction Mode In one example of the disclosure, once the first merge list for the regular merge mode is constructed, a uni-prediction motion vector is selected for triangle prediction directly from that list. To indicate a certain List 0 or List 1 motion vector that is used for triangle prediction, first, an index value is signaled to indicate which candidate from the first merge list is chosen. Then, a binary reference list indication flag (referred to as L0L1_flag) is signaled to indicate if the List 0 or the List 1 motion vector of that chosen candidate from the first merge list is selected for the first partition of triangle prediction. The same signaling method is used to indicate a second List 0 or List 1 motion vector to be used for the second partition of triangle prediction. For example, the syntaxes signaled for a triangle-mode-coded CU may include index1, L0L1_flag1, index2, L0L1_flag2. Here, index1 and index2 are the merge index values of the two candidates selected from the first merge list for the first and the second partitions, respectively. Index1 and index2 are used to locate the candidates for the first partition and the second partition (i.e., a first candidate and a second candidate), respectively. L0L1_flag1 is the binary flag for the first partition to indicate if the List 0 or List 1 motion vector of the chosen candidate based on index1 from the first merge list is selected. L0L1_flag2 is the binary flag for the second partition to indicate if the List 0 or List 1 motion vector of the chosen candidate based on index2 from the first merge list is selected. The uni-prediction MV for the first partition is obtained by selecting a List $X_1$ MV of the first candidate according to the first binary reference list indication flag L0L1_flag1, where $X_1$ takes a value of 0 or 1. The uni-prediction MV for the second partition is obtained by selecting a List $X_2$ MV of the second candidate according to the second binary reference list indication flag L0L1_flag2, where $X_2$ takes a value of 0 or 1.

FIG. 13 is a schematic diagram illustrating an example of flexible uni-prediction MV selection for triangle prediction mode in accordance with some implementations of the present disclosure. As shown in FIG. 13, every List 0 and/or List 1 motion vector indicated with a symbol "x" in a rectangular box may be indicated/signaled to the decoder for deriving prediction for the first partition, and every List 0 and/or List 1 motion vector indicated with a symbol "x" in a rectangular box may be indicated/signaled to the decoder for deriving prediction for the second partition under triangle prediction mode. As a result, the selection of uni-prediction motion vector from the first merge list becomes very flexible. Given a first merge list with a size of N candidates, up to 2N uni-prediction motion vectors may be used for each of the two triangular partitions. The two merge index values for the two partitions under triangle prediction mode do not have to be different from each other. In other words, they may take the same value. The index values are signaled directly without adjustment before signaling. More specifically, unlike what is defined in the current VVC, the second index value is signaled to the decoder directly without performing any adjustment to the value prior to signaling.

In another example of the disclosure, when the two index values are the same, the binary flag for the second partition, L0L1_flag2, does not have to be signaled. Instead, it is inferred as having the contrary value relative to the binary flag for the first partition, L0L1_flag1. In other words, in this case, L0L1_flag2 may take a value of (1-L0L1_flag1).

In yet another example of the disclosure, the binary reference list indication flags, i.e., L0L1_flag1 and L0L1_flag2, may be coded as CABAC context bins. The context used for L0L1_flag1 may be separate from the context used for L0L1_flag2. The CABAC probability under each context may be initialized at the beginning of a video sequence, and/or at the beginning of a picture, and/or at a beginning of a tile group. In this example, different context modeling methods may be used for coding these two flags. In one method, the context model selection for the second flag may be dependent on the value of the first flag. In other words, at least two context models may be used for coding the second flag, with the context model selected based on the value of the signaled first flag. In another method, the CABAC probability under each context model may be initialized differently depending on whether a current picture uses backward prediction or not. In the case where a picture uses backward prediction, the probability may be initialized higher for the flag to indicate a certain list, e.g., List 0. In yet another method, the first flag may be coded as a bypass bin, and only the second flag is coded as a context bin. The methods mentioned here may be used either separately or jointly.

In still another example of the disclosure, when a motion vector indicated by a merge index value and the associated binary reference list indication flag, i.e., L0L1_flag, does not exist, a uni-prediction zero motion vector may be used instead. That is, a uni-prediction zero MV is selected as the uni-prediction MV for the first partition upon determining that the List $X_1$ MV of the first candidate does not exist; and/or a uni-prediction zero MV is selected as the uni-prediction MV for the second partition upon determining that the List $X_2$ MV of the second candidate does not exist.

In still another example of the disclosure, when a motion vector indicated by a merge index value and the associated L0L1_flag does not exist, the corresponding motion vector indicated by the same merge index value but from the other list, i.e., List (1−L0L1_flag), may be used instead. That is, the uni-prediction MV for the first partition is obtained by selecting a List $(1-X_1)$ MV of the first candidate upon determining that the List $X_1$ MV of the first candidate does not exist; and/or the uni-prediction MV for the second partition is obtained by selecting a List $(1-X_2)$ MV of the second candidate upon determining that the List $X_2$ MV of the second candidate does not exist.

In still another example of the disclosure, for a triangle-mode-coded CU, the second L0L1_flag (i.e., L0L1_flag2) associated with the second index (i.e., index2) is not signaled but always inferred. In this case, the index1, L0L1_flag1 and index2 syntaxes still need to be signaled. In one method, L0L1_flag2 is inferred based on the value of the L0L1_flag1 and whether a current picture uses backward prediction. More specifically, for a triangle-mode-coded CU, if the current picture uses backward prediction, the value of L0L1_flag2 is inferred to be the opposite binary value of L0L1_flag1 (i.e., 1−L0L1_flag1); if the current picture does not use backward prediction, the value of L0L1_flag2 is inferred to be the same as L0L1_flag1. Additionally, if the current picture does not use backward prediction, it may be further enforced that the value of index2 is different from the value of index1 because both the two motion vectors (one for each triangle partition) are from the same prediction list. If index2 has a value equal to index 1, it means that the same motion vector would be used for both triangle partitions, which is not useful from coding efficiency perspective. In this case, in signaling the value of index2, a corresponding adjustment to the value of index2 prior to index binarization may be performed, which is the same as that in the current VVC design for index2 signaling. For example, in the case where the actual value of index1 is smaller than that of index2, a CABAC binarization codeword corresponding to (index2−1) is used to signal the value of index2; otherwise, a CABAC binarization codeword corresponding to index2 is used to signal the value of index2. Based on this example of the disclosure, alternatively, the enforcement of index2 having a different value from index1 may also be applied to the case when the current picture uses backward prediction, together with the same index2 value adjustment for CABAC binarization.

In still another example of the disclosure, for a triangle-mode-coded CU, none of the L0L1_flags are signaled. Instead, they are both inferred. In this case, the index1 and index2 syntaxes still need to be signaled, representing the merge index values of the two candidates selected from the first merge list for the first and the second partitions, respectively. Given a merge candidate index value, certain approaches may be defined or used in determining if the List 0 motion vector or the List 1 motion vector of the corresponding merge candidate from the first list is selected for triangle mode prediction. In one approach, for index1, the pattern shown in FIG. 11A is used in determining from which prediction list a motion vector of a merge candidate is selected for triangle mode prediction; and for index2, the pattern shown in FIG. 11B is used in determining from which prediction list a motion vector of a merge candidate is selected for triangle mode prediction. In other words, if index1 is an even value, List 0 motion vector of the candidate indicated by index1 is selected, and if index1 is an odd value, List 1 motion vector of the candidate indicated by index1 is selected. For index2, if it is an even value, List 1 motion vector is selected, and if it is an odd value, List 0 motion vector is selected. In the case where a motion vector corresponding to certain prediction list does not exist, certain default motion vector may be used instead, e.g., a zero motion vector, or the corresponding motion vector from the other prediction list, etc. It is also possible that the pattern shown in FIG. 11B is used for index1 and that shown in FIG. 11A used for index2, in determining from which prediction list a motion vector of a merge candidate is selected for triangle mode prediction. That is, L0L1_flags may be determined based on values of the index1 and index2.

Although the methods in this disclosure are illustrated using triangle prediction mode as an example, given that geometric merge mode can be considered as an extension or superset of the triangle prediction mode, the methods illustrated in this disclosure are naturally applicable to geometric merge mode as well. All the merge list construction methods illustrated in this disclosure can be naturally used for geometric merge mode without any modification. Likewise, all the merge index signaling methods illustrated in this disclosure can be naturally used for geometric merge mode without any modification. In one example, the same merge list construction process according to FIG. 11A is used for geometric merge mode. In another example, the same merge list construction process according to FIG. 11B is used for geometric merge mode. Also, it is worth mentioning that a same merge list construction process can be shared and used for both triangle prediction mode and geometric merge mode, if both modes exist in VVC.

It should be mentioned that although a first merge list containing 5 merge candidates is used in some examples in this disclosure, in practice the size of the first merge list may be defined differently, e.g., 6 or 4, or some other values. The methods illustrated in the examples are applicable to the cases when the first merge list has a size other than 5.

In the above examples, motion vector pruning may be performed as well. Such pruning may be done fully, or partially. When it is performed partially, it means a new motion vector is compared against some, but not all, of the motion vectors that are already in the uni-prediction merge list. It may also mean that only some, but not all, new motion vectors need to be checked for pruning before used as merge candidates for triangle prediction. One specific example is that only the second motion vector is checked against the first motion vector for pruning before it is used as a merge candidate for triangle prediction, while all other motion vectors are not checked for pruning. In the extreme case, no motion vector pruning (i.e., motion vector comparison operation) is performed in the process.

Figure 15:
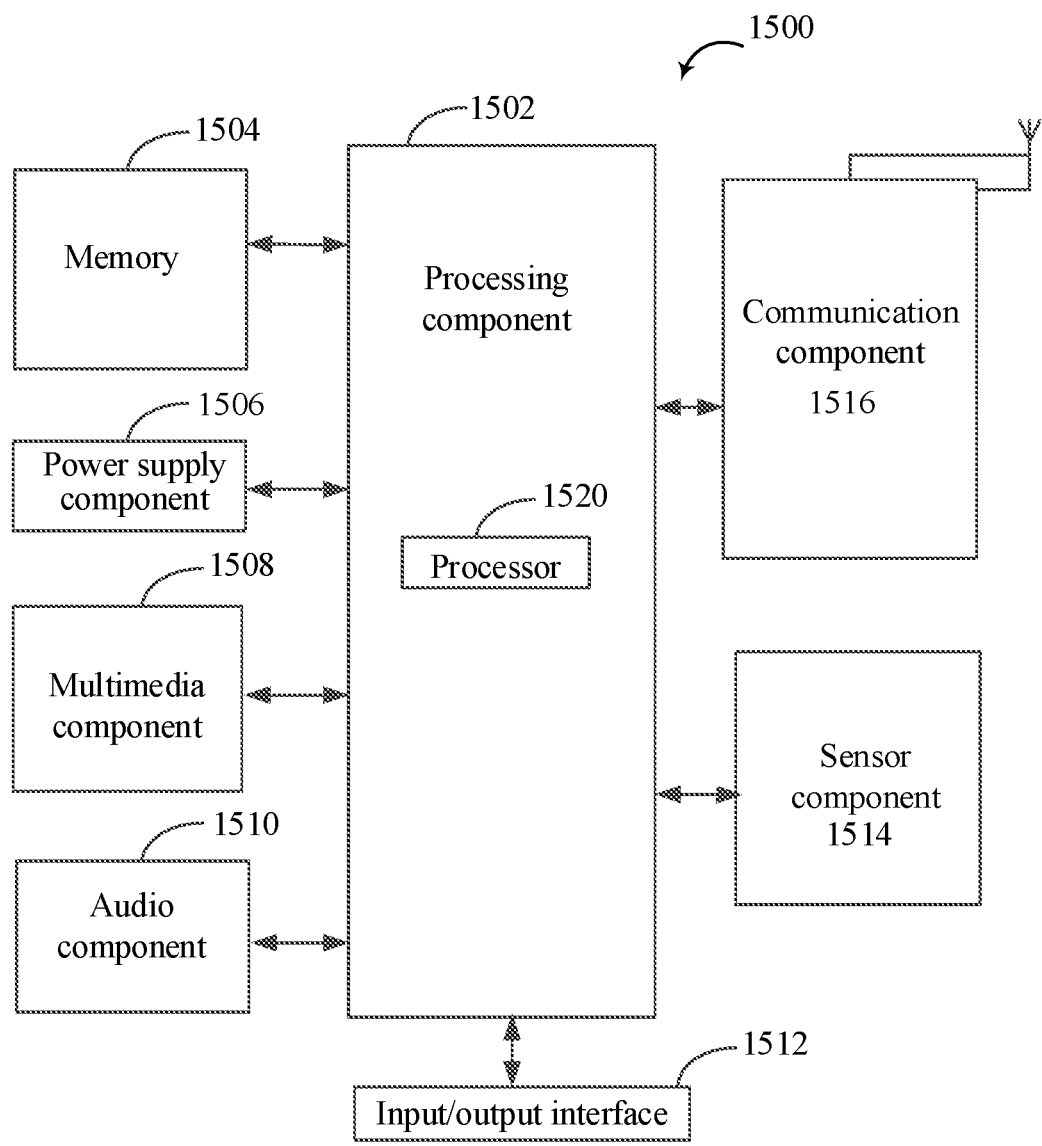
FIG. 15 is a block diagram illustrating an exemplary apparatus for video coding in accordance with some implementations of the present disclosure.

FIG. 15 is a block diagram illustrating an apparatus for video coding in accordance with some implementations of the present disclosure. The apparatus 1500 may be a terminal, such as a mobile phone, a tablet computer, a digital broadcast terminal, a tablet device, or a personal digital assistant.

As shown in FIG. 15, the apparatus 1500 may include one or more of the following components: a processing component 1502, a memory 1504, a power supply component 1506, a multimedia component 1508, an audio component 1510, an input/output (I/O) interface 1512, a sensor component 1514, and a communication component 1516.

The processing component 1502 usually controls overall operations of the apparatus 1500, such as operations relating to display, a telephone call, data communication, a camera operation and a recording operation. The processing component 1502 may include one or more processors 1520 for executing instructions to complete all or a part of steps of the above method. Further, the processing component 1502 may include one or more modules to facilitate interaction between the processing component 1502 and other components. For example, the processing component 1502 may include a multimedia module to facilitate the interaction between the multimedia component 1508 and the processing component 1502.

The memory 1504 is configured to store different types of data to support operations of the apparatus 1500. Examples of such data include instructions, contact data, phonebook data, messages, pictures, videos, and so on for any application or method that operates on the apparatus 1500. The memory 1504 may be implemented by any type of volatile or non-volatile storage devices or a combination thereof, and the memory 1504 may be a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic disk or a compact disk.

The power supply component 1506 supplies power for different components of the apparatus 1500. The power supply component 1506 may include a power supply management system, one or more power supplies, and other components associated with generating, managing and distributing power for the apparatus 1500.

The multimedia component 1508 includes a screen providing an output interface between the apparatus 1500 and a user. In some examples, the screen may include a Liquid Crystal Display (LCD) and a Touch Panel (TP). If the screen includes a touch panel, the screen may be implemented as a touch screen receiving an input signal from a user. The touch panel may include one or more touch sensors for sensing a touch, a slide and a gesture on the touch panel. The touch sensor may not only sense a boundary of a touching or sliding actions, but also detect duration and pressure related to the touching or sliding operation. In some examples, the multimedia component 1508 may include a front camera and/or a rear camera. When the apparatus 1500 is in an operation mode, such as a shooting mode or a video mode, the front camera and/or the rear camera may receive external multimedia data.

The audio component 1510 is configured to output and/or input an audio signal. For example, the audio component 1510 includes a microphone (MIC). When the apparatus 1500 is in an operating mode, such as a call mode, a recording mode and a voice recognition mode, the microphone is configured to receive an external audio signal. The received audio signal may be further stored in the memory 1504 or sent via the communication component 1516. In some examples, the audio component 1510 further includes a speaker for outputting an audio signal.

The I/O interface 1512 provides an interface between the processing component 1502 and a peripheral interface module. The above peripheral interface module may be a keyboard, a click wheel, a button, or the like. These buttons may include but not limited to, a home button, a volume button, a start button and a lock button.

The sensor component 1514 includes one or more sensors for providing a state assessment in different aspects for the apparatus 1500. For example, the sensor component 1514 may detect an on/off state of the apparatus 1500 and relative locations of components. For example, the components are a display and a keypad of the apparatus 1500. The sensor component 1514 may also detect a position change of the apparatus 1500 or a component of the apparatus 1500, presence or absence of a contact of a user on the apparatus 1500, an orientation or acceleration/deceleration of the apparatus 1500, and a temperature change of apparatus 1500. The sensor component 1514 may include a proximity sensor configured to detect presence of a nearby object without any physical touch. The sensor component 1514 may further include an optical sensor, such as a CMOS or CCD image sensor used in an imaging application. In some examples, the sensor component 1514 may further include an acceleration sensor, a gyroscope sensor, a magnetic sensor, a pressure sensor, or a temperature sensor.

The communication component 1516 is configured to facilitate wired or wireless communication between the apparatus 1500 and other devices. The apparatus 1500 may access a wireless network based on a communication standard, such as WiFi, 4G, or a combination thereof. In an example, the communication component 1516 receives a broadcast signal or broadcast related information from an external broadcast management system via a broadcast channel. In an example, the communication component 1516 may further include a Near Field Communication (NFC) module for promoting short-range communication. For example, the NFC module may be implemented based on Radio Frequency Identification (RFID) technology, infrared data association (IrDA) technology, Ultra-Wide Band (UWB) technology, Bluetooth (BT) technology and other technology.

In an example, the apparatus 1500 may be implemented by one or more of Application Specific Integrated Circuits (ASIC), Digital Signal Processors (DSP), Digital Signal Processing Devices (DSPD), Programmable Logic Devices (PLD), Field Programmable Gate Arrays (FPGA), controllers, microcontrollers, microprocessors or other electronic elements to perform the above method.

A non-transitory computer readable storage medium may be, for example, a Hard Disk Drive (HDD), a Solid-State Drive (SSD), Flash memory, a Hybrid Drive or Solid-State Hybrid Drive (SSHD), a Read-Only Memory (ROM), a Compact Disc Read-Only Memory (CD-ROM), a magnetic tape, a floppy disk and etc.

Figure 16:
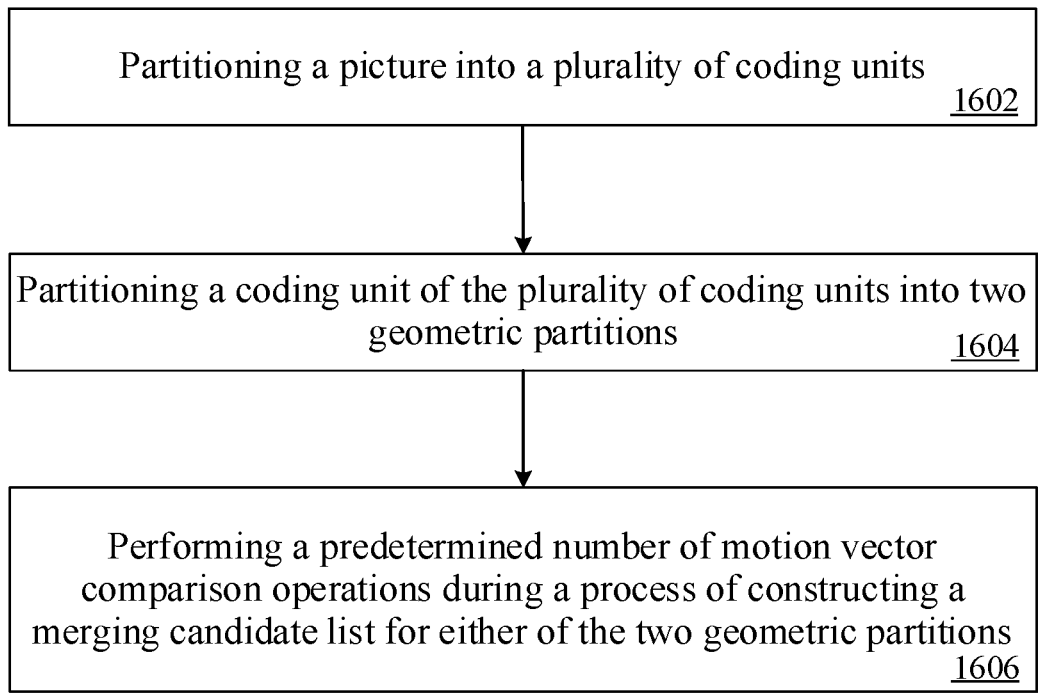
FIG. 16 is a flowchart illustrating an exemplary process of video coding for motion compensated prediction using geometric prediction unit in accordance with some implementations of the present disclosure.

FIG. 16 is a flowchart illustrating an exemplary process of video coding for motion compensated prediction using geometric partition in accordance with some implementations of the present disclosure.

In step 1602, the processor 1520 partitions a picture into a plurality of coding units, at least one of which is further partitioned into two prediction units (PUs). The two PUs may include at least one geometric shaped PU.

In step 1604, the processor 1520 further partitions a coding unit of the plurality of coding units into two geometric partitions. For example, the geometric partitions may include a pair of triangular shaped partitions, a pair of wedge-shaped partitions, or other geometric shaped partitions.

In step 1606, the processor 1520 performs a predetermined number of motion vector comparison operations during a process of constructing a merging candidate list for either of the two geometric partitions.

In some examples, the processor 1520 may configure a counter for the coding unit to count a total number of motion vector comparison operations that have been performed while selecting motion vectors into the merging candidate list.

In some examples, if the processor 1520 determines that the counter is smaller than the predetermined number, the processor 1520 can perform a motion vector comparison operation to check if a current motion vector is different from the motion vectors in the merging candidate list.

In some examples, if the processor 1520 performs a motion vector comparison operation, the processor 1520 may increment the counter.

In some examples, if the processor 1520 determines that the counter reaches the predetermined number, the processor 1520 may add a current motion vector into the merging candidate list without performing a motion vector comparison operation.

In some examples, each of the motion vector comparison operations may comprise comparing picture order count (POC) values and motion vectors or comparing reference picture indexes and motion vectors.

In some examples, in order to construct the merging candidate list, the processor 1520 may construct a first merge list comprising a plurality of candidates based on a merge list construction process for regular merge prediction. Each of the plurality of candidates may comprise a List 0 motion vector or a List 1 motion vector or both the List 0 motion vector and the List 1 motion vector. Then, the processor 1520 may obtain motion vectors for either of the two geometric partitions by selecting the List 0 motion vector or the List 1 motion vector of the plurality of candidates based on merge indexes of the plurality of candidates.

In some examples, the processor 1520 can determine whether to perform a motion vector comparison operation on a motion vector obtained for either of the two geometric partitions based on a total number of performed motion vector comparison operations. The total number is no more than the predetermined number.

In some examples, if the processor 1520 determines that the predetermined number is equal to one, the processor 1520 may obtain a first motion vector from a first candidate in the first merge list by: selecting a List 0 motion vector of the first candidate into the merging candidate list, if the List 0 motion vector of the first candidate is available; and selecting a List 1 motion vector of the first candidate into the merging candidate list, if the List 0 motion vector of the first candidate is unavailable.

In some examples, the processor 1520 can obtain a second motion vector from a second candidate in the first merge list by: selecting a List 1 motion vector of the second candidate, if the List 1 motion vector of the second candidate is available; and selecting a List 0 motion vector of the second candidate, if the List 1 motion vector of the second candidate is unavailable; comparing the second motion vector to the first motion vector in the merging candidate list; and if the second motion vector is different from the first motion vector, adding the second motion vector into the merging candidate list.

In some examples, if the processor 1520 determines that a candidate after the second candidate in the first merge list has an odd merge index, the processor 1520 may select a List 1 motion vector of the candidate into the merging candidate list, if the List 1 motion vector of the candidate is available; and select a List 0 motion vector of the candidate into the merging candidate list, if the List 1 motion vector of the candidate is unavailable. If the processor 1520 determines that the candidate has an even merge index, the processor 1520 may select the List 0 motion vector of the candidate into the merging candidate list, if the List 0 motion vector of the candidate is available; and select the List 1 motion vector of the candidate into the merging candidate list, if the List 0 motion vector of the candidate is unavailable. If the processor 1520 determines that the merging candidate list is not full after processing all candidates in the first merge list, the processor 1520 can add a zero vector into the merging candidate list.

In some examples, a merge index of a motion vector in the merging candidate list may be equal to a merge index of a corresponding candidate in the first merge list subtracted by the number of candidates pruned out before obtaining the motion vector.

In some examples, the selection order of the List 0 motion vector and the List 1 motion vector of a candidate in the first merge list can be based on parity of a merge index of the candidate in the first merge list.

In some examples, the processor 1520 can decode and parse a merge index of a motion vector. The processor 1520 may derive a merge index of a corresponding candidate in the first merge list based on a motion vector pruning result and the parsed merge index. Then, the processor 1520 may select a List 0 motion vector or a List 1 motion vector of the corresponding candidate in the first merge list to be used for the coding unit, based on parity of the merge index of the corresponding candidate in the first merge list.

In some examples, the selection order of the List 0 motion vector and the List 1 motion vector of a candidate in the first merge list can be based on parity of a merge index of a motion vector in the merging candidate list obtained after motion vector pruning.

In some examples, the processor 1520 may decode and parse a merge index of a motion vector. The processor 1520 can derive a merge index of a corresponding candidate in the first merge list based on a motion vector pruning result and the parsed merge index. The, the processor 1520 may select a List 0 motion vector or a List 1 motion vector of the corresponding candidate in the first merge list to be used for the coding unit, based on parity of the parsed merge index.

In some examples, there is provided an apparatus for video coding. The apparatus includes a processor 1520; and a memory 1504 configured to store instructions executable by the processor; where the processor, upon execution of the instructions, is configured to perform a method as illustrated in FIG. 16.

In some other examples, there is provided a non-transitory computer readable storage medium 1504, having instructions stored therein. When the instructions are executed by a processor 1520, the instructions cause the processor to perform a method as illustrated in FIG. 16.

The description of the present disclosure has been presented for purposes of illustration, and is not intended to be exhaustive or limited to the present disclosure. Many modifications, variations, and alternative implementations will be apparent to those of ordinary skill in the art having the benefit of the teachings presented in the foregoing descriptions and the associated drawings.

The examples were chosen and described in order to explain the principles of the disclosure, and to enable others skilled in the art to understand the disclosure for various implementations and to best utilize the underlying principles and various implementations with various modifications as are suited to the particular use contemplated. Therefore, it is to be understood that the scope of the disclosure is not to be limited to the specific examples of the implementations disclosed and that modifications and other implementations are intended to be included within the scope of the present disclosure.

What is claimed is:

1. A method for video decoding, comprising:
   partitioning a picture into a plurality of coding units;
   partitioning a coding unit of the plurality of coding units into two geometric partitions;
   constructing a merge list for either of the two geometric partitions; and
   performing a predetermined number of motion vector comparison operations, the motion vector comparison operation comprising comparison between a current motion vector and a motion vector that is already selected in the merge list during a process of constructing the merge list,
   wherein constructing the merge list comprises:
   constructing a first merge list comprising a plurality of candidates based on a merge list construction process for regular merge prediction, wherein each of the plurality of candidates comprises a List 0 motion vector or a List 1 motion vector or both the List 0 motion vector and the List 1 motion vector; and
   obtaining motion vectors for either of the two geometric partitions by selecting the List 0 motion vector or the List 1 motion vector of the plurality of candidates based on merge indexes of the plurality of candidates,
   wherein the method further comprises:
   in response to determining that the predetermined number is equal to one, obtaining a first motion vector from a first candidate in the first merge list by:
   selecting a List 0 motion vector of the first candidate into the merge list, in response to determining that the List 0 motion vector of the first candidate is available; and
   selecting a List 1 motion vector of the first candidate into the merge list, in response to determining that the List 0 motion vector of the first candidate is unavailable.

2. The method of claim 1, further comprising:
   configuring a counter for the coding unit to count a total number of motion vector comparison operations that have been performed while selecting motion vectors into merge list.

3. The method of claim 2, further comprising:
   in response to determining that the counter is smaller than the predetermined number, performing a motion vector comparison operation to check if a current motion vector is different from the motion vectors in the merge list.

4. The method of claim 2, further comprising:
   in response to performing a motion vector comparison operation, incrementing the counter.

5. The method of claim 2, further comprising:
   in response to determining that the counter reaches the predetermined number, adding a current motion vector into the merge list without performing a motion vector comparison operation.

6. The method of claim 1, wherein each of the motion vector comparison operations comprises one of following operations:
   comparing picture order count (POC) values and motion vectors; or
   comparing reference picture indexes and motion vectors.

7. The method of claim 1, further comprising:
   determining whether to perform a motion vector comparison operation on a motion vector obtained for either of the two geometric partitions based on a total number of performed motion vector comparison operations, wherein the total number is no more than the predetermined number.

8. The method of claim 1, further comprising:
   obtaining a second motion vector from a second candidate in the first merge list by:
   selecting a List 1 motion vector of the second candidate, in response to determining that the List 1 motion vector of the second candidate is available; and
   selecting a List 0 motion vector of the second candidate, in response to determining that the List 1 motion vector of the second candidate is unavailable;
   comparing the second motion vector to the first motion vector in the merge list; and
   in response to determining that the second motion vector is different from the first motion vector, adding the second motion vector into the merge list.

9. The method of claim 8, further comprising:
   in response to determining that a candidate after the second candidate in the first merge list has an odd merge index,
   selecting a List 1 motion vector of the candidate into the merge list, in response to determining that the List 1 motion vector of the candidate is available;
   selecting a List 0 motion vector of the candidate into the merge list, in response to determining that the List 1 motion vector of the candidate is unavailable;
   in response to determining that the candidate has an even merge index,
   selecting the List 0 motion vector of the candidate into the merge list, in response to determining that the List 0 motion vector of the candidate is available;
   selecting the List 1 motion vector of the candidate into the merge list, in response to determining that the List 0 motion vector of the candidate is unavailable; and
   in response to determining that the merge list is not full after processing all candidates in the first merge list, adding a zero vector into the merge list.

10. The method of claim 1, wherein a merge index of a motion vector in the merge list is equal to a merge index of a corresponding candidate in the first merge list subtracted by the number of candidates pruned out before obtaining the motion vector.

11. The method of claim 1, wherein the selection order of the List 0 motion vector and the List 1 motion vector of a candidate in the first merge list is based on parity of a merge index of the candidate in the first merge list.

12. The method of claim 11, further comprising:
decoding and parsing a merge index of a motion vector;
deriving a merge index of a corresponding candidate in the first merge list based on a motion vector pruning result and the parsed merge index; and
selecting a List 0 motion vector or a List 1 motion vector of the corresponding candidate in the first merge list to be used for the coding unit, based on parity of the merge index of the corresponding candidate in the first merge list.

13. The method of claim 1, wherein the selection order of the List 0 motion vector and the List 1 motion vector of a candidate in the first merge list is based on parity of a merge index of a motion vector in the merge list obtained after motion vector pruning.

14. The method of claim 13, further comprising:
decoding and parsing a merge index of a motion vector;
deriving a merge index of a corresponding candidate in the first merge list based on a motion vector pruning result and the parsed merge index; and
selecting a List 0 motion vector or a List 1 motion vector of the corresponding candidate in the first merge list to be used for the coding unit, based on parity of the parsed merge index.

15. An apparatus for video decoding, comprising:
one or more processors; and
a non-transitory computer-readable storage medium configured to store instructions executable by the one or more processors, the instructions, when executed by the one or more processors, causing the apparatus for video decoding to perform operations comprising:
partitioning a picture into a plurality of coding units;
constructing a merge list for either of the two geometric partitions; and
performing a predetermined number of motion vector comparison operations, the motion vector comparison operation comprising comparison between a current motion vector and a motion vector that is already selected in the merge list,
wherein constructing the merge list comprises:
constructing a first merge list comprising a plurality of candidates based on a merge list construction process for regular merge prediction, wherein each of the plurality of candidates comprises a List 0 motion vector or a List 1 motion vector or both the List 0 motion vector and the List 1 motion vector; and
obtaining motion vectors for either of the two geometric partitions by selecting the List 0 motion vector or the List 1 motion vector of the plurality of candidates based on merge indexes of the plurality of candidates,
wherein the operations further comprise:
in response to determining that the predetermined number is equal to one, obtaining a first motion vector from a first candidate in the first merge list by:
selecting a List 0 motion vector of the first candidate into the merge list, in response to determining that the List 0 motion vector of the first candidate is available; and
selecting a List 1 motion vector of the first candidate into the merge list, in response to determining that the List 0 motion vector of the first candidate is unavailable.

16. The apparatus of claim 15, wherein the instructions, when executed by the one or more processors, causing the apparatus for video decoding to perform operations further comprising:
configuring a counter for the coding unit to count a total number of motion vector comparison operations that have been performed while selecting motion vectors into the merge list.

17. The apparatus of claim 15, wherein the instructions, when executed by the one or more processors, causing the apparatus for video decoding to perform operations further comprising:
in response to determining that the counter is smaller than the predetermined number, performing a motion vector comparison operation to check if a current motion vector is different from the motion vectors in the merge list.

18. A non-transitory computer-readable storage medium for video decoding storing computer-executable instructions that, when executed by one or more computer processors, causing the one or more computer processors to perform operations comprising:
partitioning a picture into a plurality of coding units;
partitioning a coding unit of the plurality of coding units into two geometric partitions;
constructing a merge list for either of the two geometric partitions; and
performing a predetermined number of motion vector comparison operations, the motion vector comparison operation comprising comparison between a current motion vector and a motion vector that is already selected in the merge list,
wherein constructing the merge list comprises:
constructing a first merge list comprising a plurality of candidates based on a merge list construction process for regular merge prediction, wherein each of the plurality of candidates comprises a List 0 motion vector or a List 1 motion vector or both the List 0 motion vector and the List 1 motion vector; and
obtaining motion vectors for either of the two geometric partitions by selecting the List 0 motion vector or the List 1 motion vector of the plurality of candidates based on merge indexes of the plurality of candidates,
wherein the operations further comprise:
in response to determining that the predetermined number is equal to one, obtaining a first motion vector from a first candidate in the first merge list by:
selecting a List 0 motion vector of the first candidate into the merge list, in response to determining that the List 0 motion vector of the first candidate is available; and
selecting a List 1 motion vector of the first candidate into the merge list, in response to determining that the List 0 motion vector of the first candidate is unavailable.

* * * * *